US007448503B2

(12) United States Patent
Magee et al.

(10) Patent No.: US 7,448,503 B2

(45) Date of Patent: Nov. 11, 2008

(54) MULTI-PATTERNED SURFACE COVERING SAMPLE ELEMENTS, DISPLAY SYSTEMS, AND METHODS

(75) Inventors: Ronald Magee, LaGrange, GA (US); Jennifer L. Beedy, LaGrange, GA (US); James L. Thorn, Jr., Mechanicsville, VA (US); J. Michael Hartley, LaGrange, GA (US); R. Lee Burch, III, LaGrange, GA (US); Dane M. Owen, LaGrange, GA (US); Debra M. Michalak, East Point, GA (US); Ritchie D. Eisenhour, Catawba, NC (US); Shandra L. Shermerhorn, LaGrange, GA (US); Marilyn F. McClanahan, LaGrange, GA (US); Ellen E. Olsen, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/150,442

(22) Filed: May 17, 2002

(65) Prior Publication Data

US 2003/0004695 A1 Jan. 2, 2003

Related U.S. Application Data

(63) Continuation-in-part of application No. 09/860,974, filed on May 18, 2001, now abandoned.

(51) Int. Cl.
*A47F 7/00* (2006.01)
*B32B 3/02* (2006.01)

(52) U.S. Cl. .......................... 211/49.1; 428/85; 428/95; 428/92

(58) Field of Classification Search ................... 428/95, 428/92, 85; D6/582, 588; D5/66; 211/49.1
See application file for complete search history.

(56) References Cited

U.S. PATENT DOCUMENTS

| | | | | | |
|---|---|---|---|---|---|
| D10,150 | S | * | 8/1877 | Hamer | D6/588 |
| 1,612,791 | A | | 1/1927 | Ames et al. | |
| D74,032 | S | * | 12/1927 | Stroud | D6/593 |
| D74,286 | S | * | 1/1928 | Stroud | D6/593 |
| D74,486 | S | * | 2/1928 | Fauser | D6/588 |
| D74,493 | S | * | 2/1928 | Fauser | D6/588 |
| D83,523 | S | * | 3/1931 | Fauser | D6/588 |
| D95,119 | S | * | 4/1935 | Cohen | D6/588 |
| D96,597 | S | * | 8/1935 | Fago | D6/588 |
| 2,013,741 | A | | 9/1935 | Butler et al. | 35/53 |
| 2,245,202 | A | * | 6/1941 | Krasno | 156/62 |
| D172,987 | S | * | 9/1954 | Quigley | D6/588 |
| 3,530,984 | A | | 9/1970 | Howard | 206/82 |
| 3,726,027 | A | | 4/1973 | Cohen et al. | 35/72 |

(Continued)

*Primary Examiner*—Lynda Salvatore
(74) *Attorney, Agent, or Firm*—Daniel R. Alexander

(57) ABSTRACT

Surface covering display elements, systems and/or methods are provided. In accordance with one embodiment, a multi-patterned rug display sample, element or unit has at least two different geometric designs and/or coloration schemes across a common surface for simultaneous comparative evaluation by a potential purchaser. The rug display sample may be patterned to include two or more geometric or solid patterns corresponding to patterns available on floor covering products independent of the display sample. Also, the display unit may include a feature rug, color runner, color rug, and/or hang tag.

6 Claims, 30 Drawing Sheets

U.S. PATENT DOCUMENTS

| | | | | | |
|---|---|---|---|---|---|
| 3,965,583 | A | | 6/1976 | Price | 35/55 |
| 4,063,648 | A | | 12/1977 | Fuller et al. | 211/45 |
| D253,328 | S | * | 11/1979 | Thompson | D6/582 |
| 4,253,259 | A | | 3/1981 | Schaffer et al. | 40/492 |
| 4,256,043 | A | | 3/1981 | Ovitz, III | 108/29 |
| 4,318,121 | A | | 3/1982 | Taite et al. | 358/22 |
| 4,331,245 | A | | 5/1982 | Schell | 211/49 |
| D274,298 | S | * | 6/1984 | Thompson | D6/582 |
| 4,498,828 | A | | 2/1985 | Ackerman | 412/4 |
| 4,542,827 | A | | 9/1985 | Pilzer | 206/483 |
| 4,659,602 | A | | 4/1987 | Birch | 428/88 |
| 4,685,573 | A | | 8/1987 | Ovitz, III | 211/46 |
| 4,820,566 | A | * | 4/1989 | Heine et al. | 428/88 |
| 4,872,580 | A | | 10/1989 | Fuller et al. | 211/45 |
| 4,998,882 | A | | 3/1991 | Glover | 434/98 |
| 5,031,781 | A | | 7/1991 | Price et al. | 211/45 |
| 5,109,991 | A | | 5/1992 | McPherson et al. | 211/45 |
| 5,368,485 | A | | 11/1994 | Phillips | 434/75 |
| 5,658,124 | A | | 8/1997 | Presnell, III | 414/786 |
| 5,751,829 | A | | 5/1998 | Ringland et al. | 382/100 |
| 5,806,688 | A | | 9/1998 | Adenau et al. | 211/47 |
| 5,931,301 | A | | 8/1999 | Hadden et al. | 206/449 |
| D414,623 | S | | 10/1999 | Crump | D6/409 |
| 5,975,577 | A | | 11/1999 | Gottdiener | 281/21.1 |
| D429,105 | S | * | 8/2000 | Dowd | D6/588 |
| 6,134,557 | A | | 10/2000 | Freeman | 707/102 |
| D439,436 | S | | 3/2001 | Stern | D6/409 |
| 6,286,689 | B1 | | 9/2001 | Sherwood et al. | 211/45 |
| 2002/0011456 | A1 | | 1/2002 | Hatami | 211/46 |
| 2002/0034507 | A1 | * | 3/2002 | Koishihara | 424/130.1 |
| 2002/0034607 | A1 | | 3/2002 | Stoyles | 428/95 |

* cited by examiner

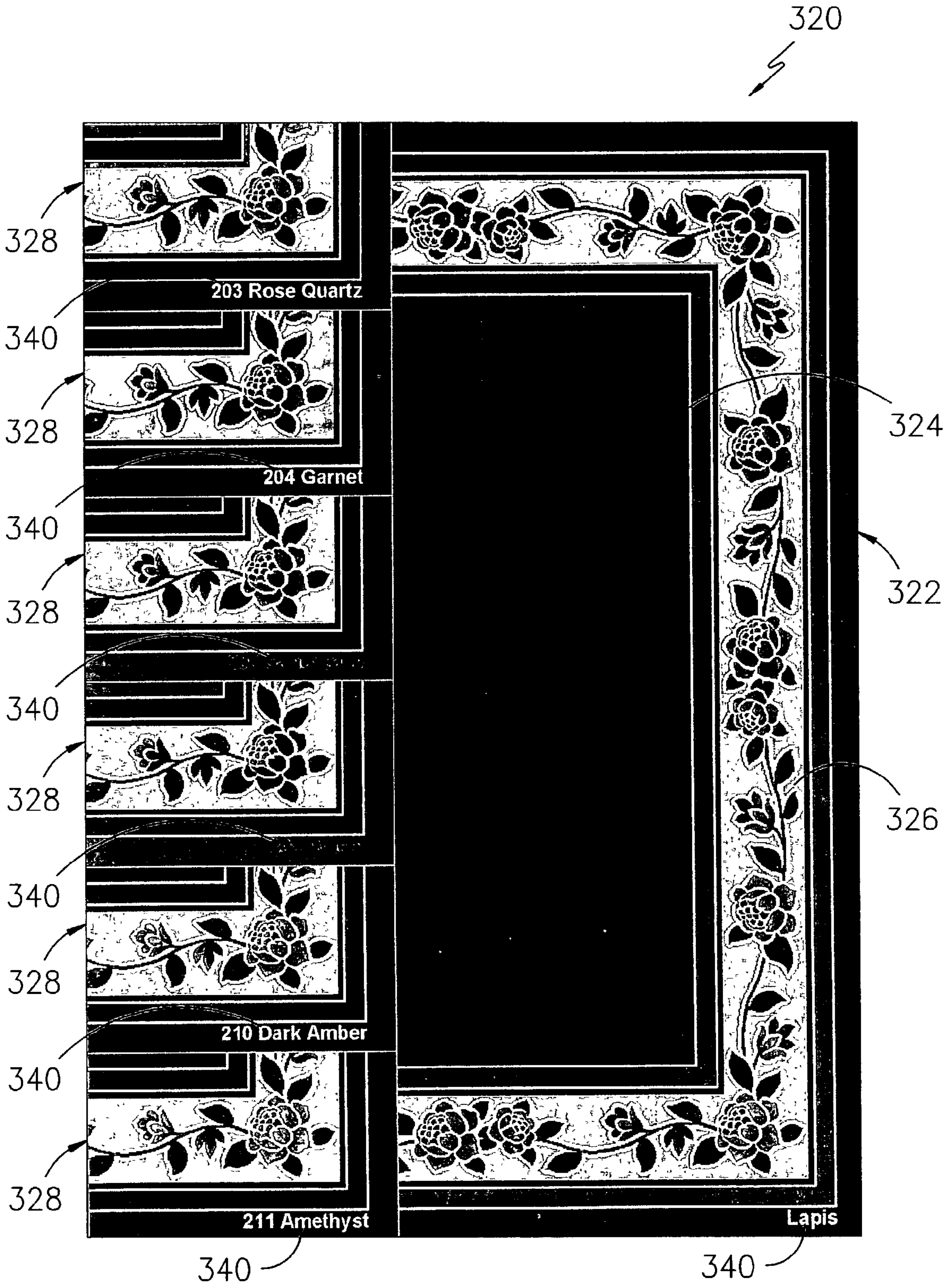
*FIG. −3−*

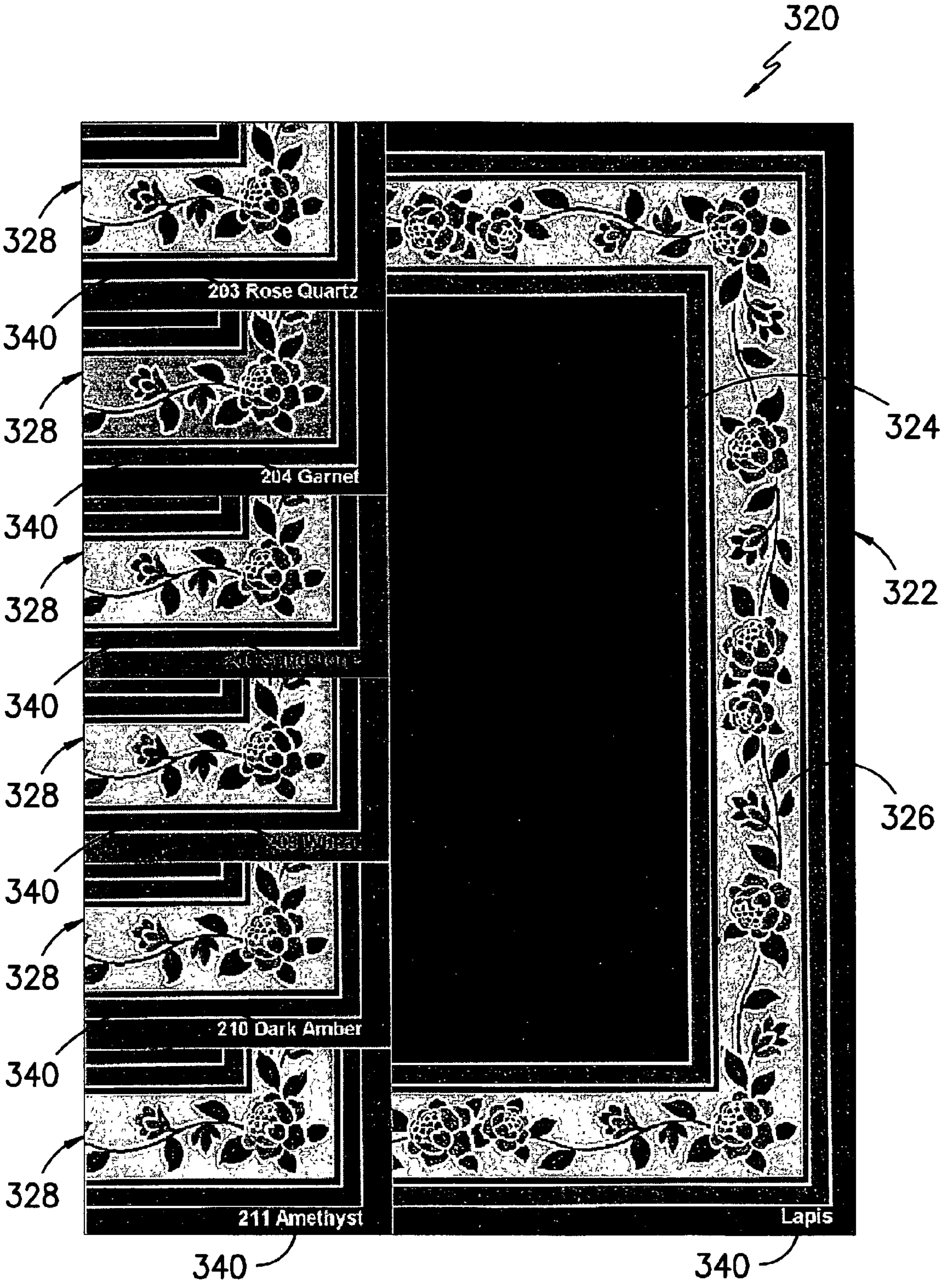
*FIG. —3A—*

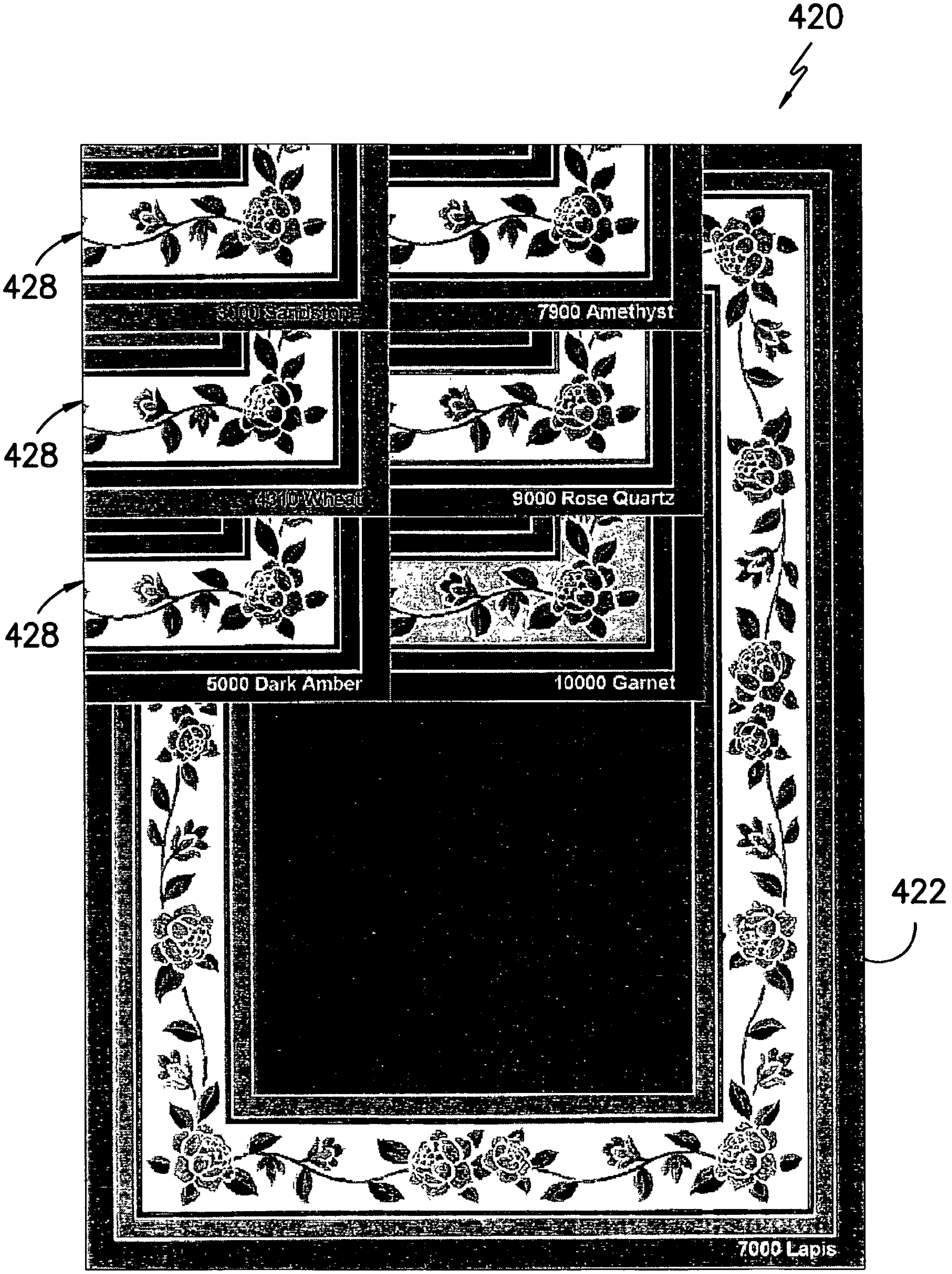
*FIG. –4A–*

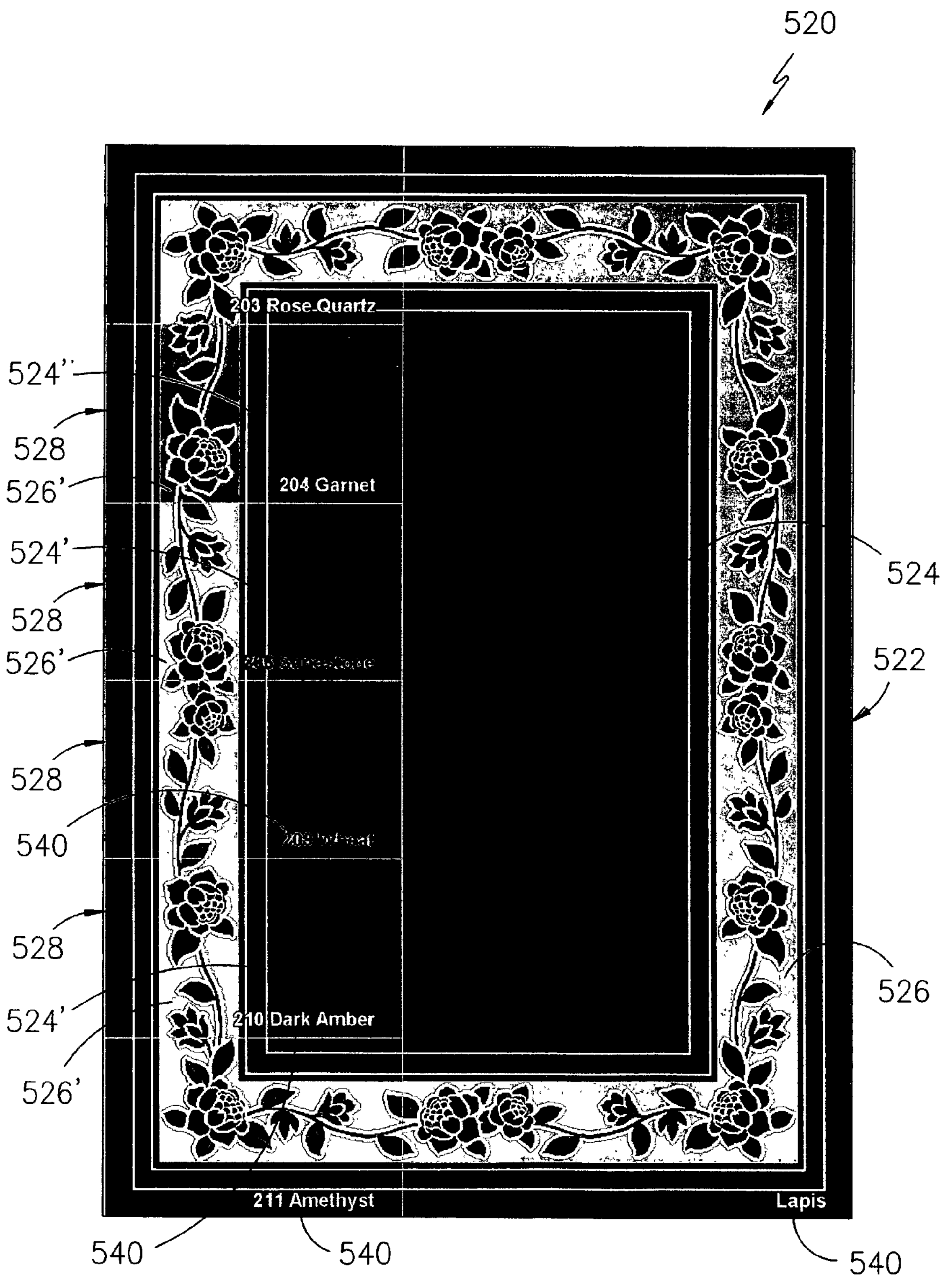
*FIG. −5−*

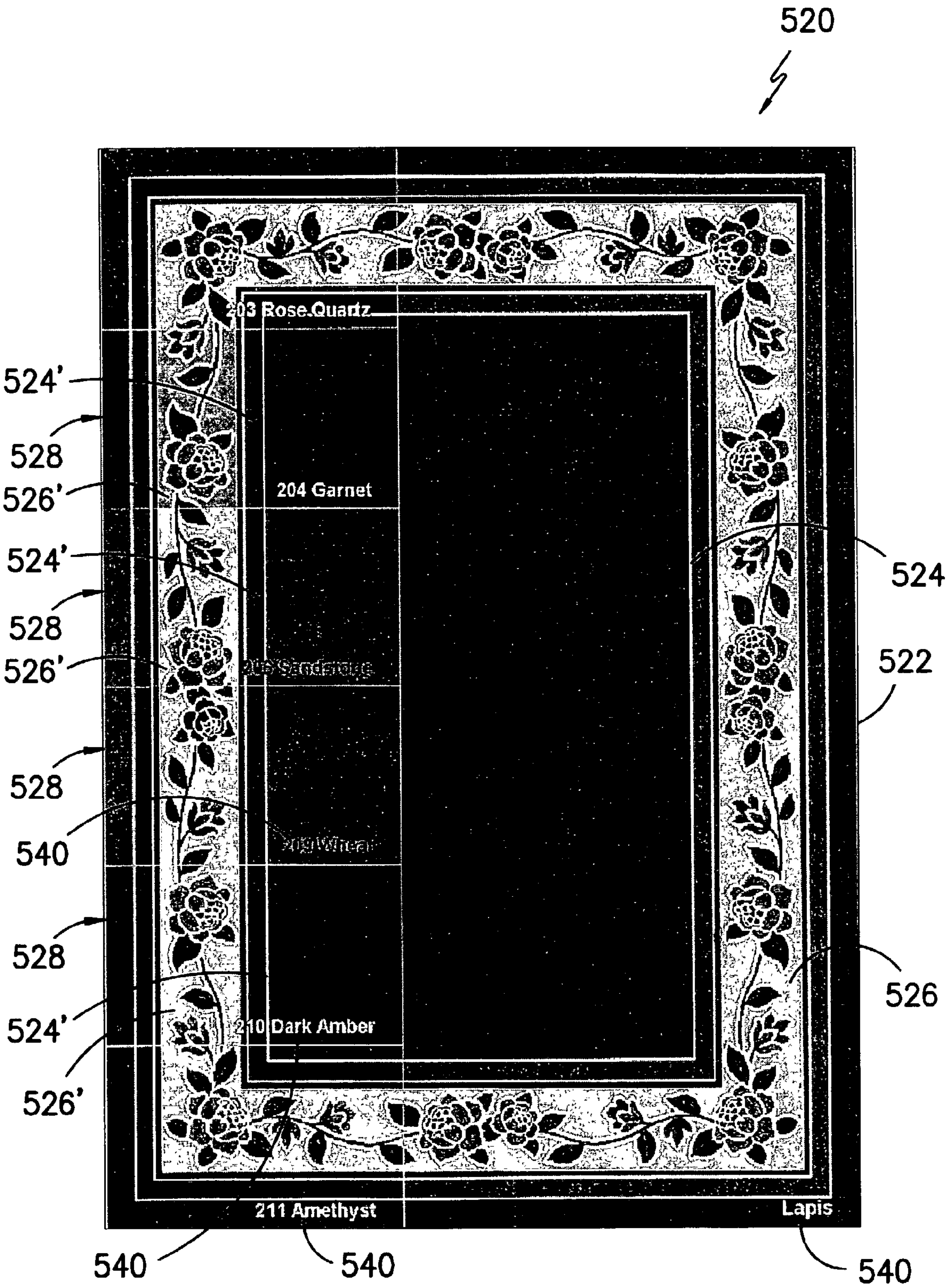
FIG. –5A–

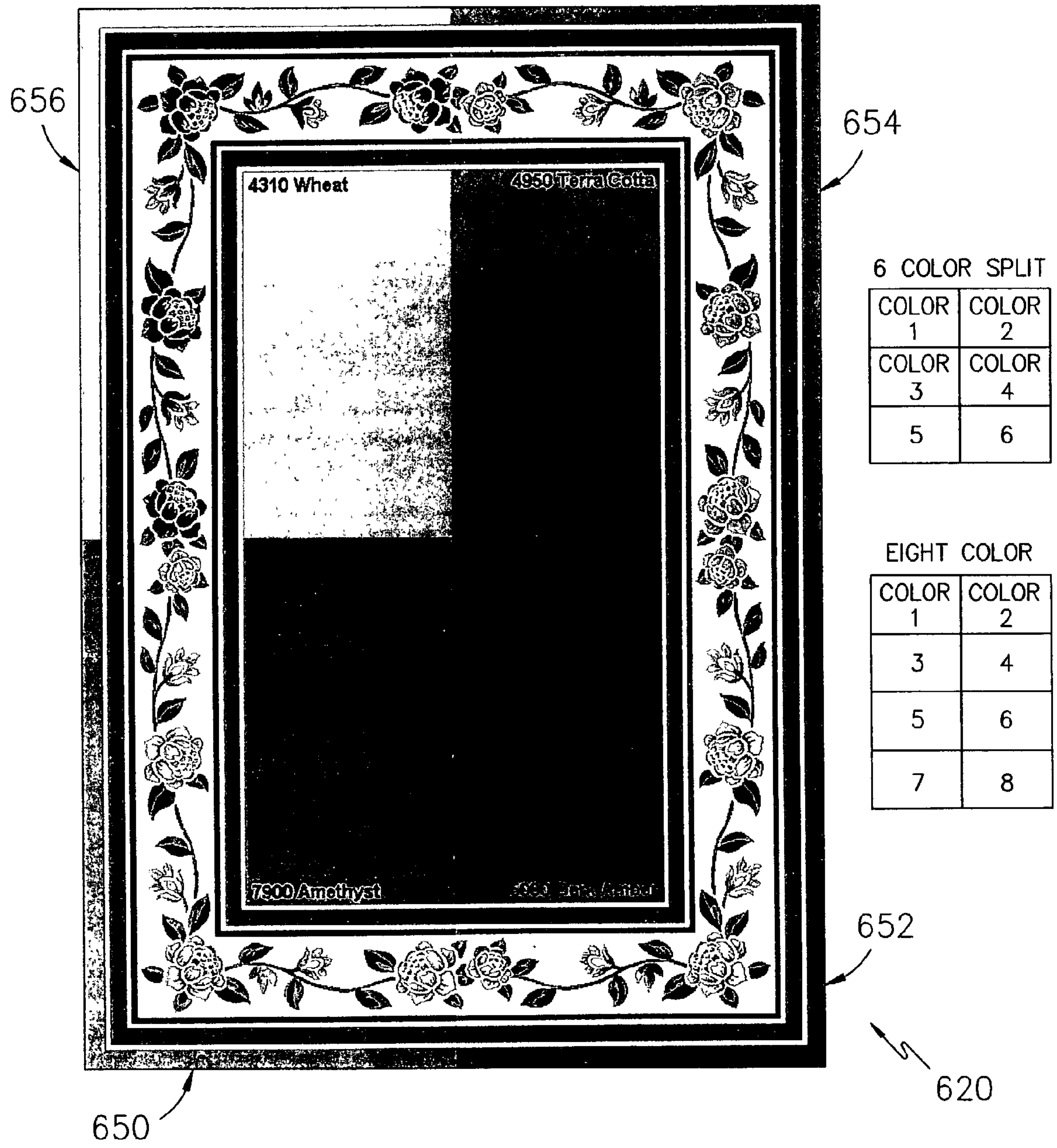
6 COLOR SPLIT
| | |
|---|---|
| COLOR 1 | COLOR 2 |
| COLOR 3 | COLOR 4 |
| 5 | 6 |
EIGHT COLOR
| | |
|---|---|
| COLOR 1 | COLOR 2 |
| 3 | 4 |
| 5 | 6 |
| 7 | 8 |
*FIG. –6–*

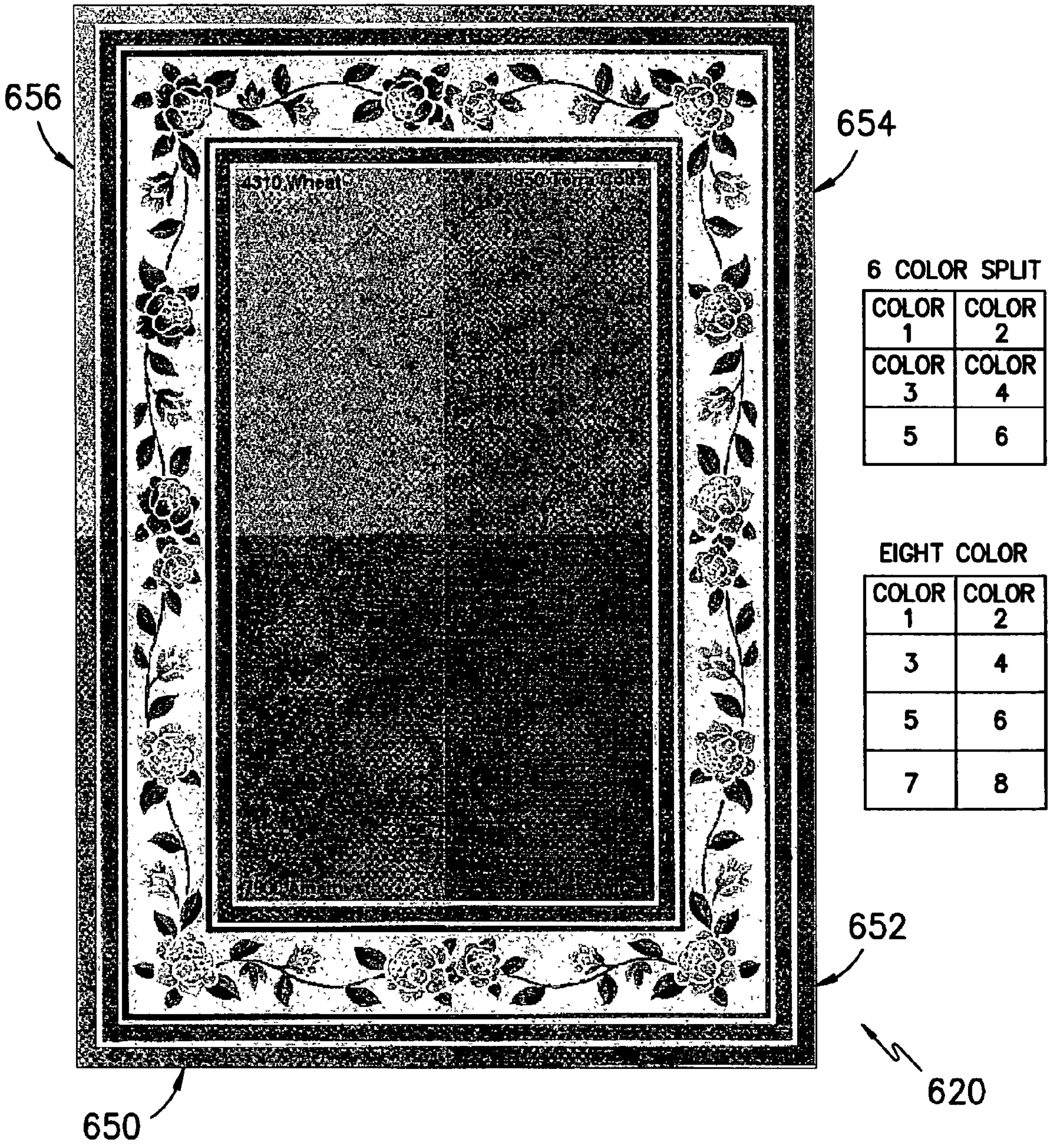
6 COLOR SPLIT
| | |
|---|---|
| COLOR 1 | COLOR 2 |
| COLOR 3 | COLOR 4 |
| 5 | 6 |
EIGHT COLOR
| | |
|---|---|
| COLOR 1 | COLOR 2 |
| 3 | 4 |
| 5 | 6 |
| 7 | 8 |
*FIG. –6A–*

6 COLOR SPLIT

| | |
|---|---|
| COLOR 1 | COLOR 2 |
| COLOR 3 | COLOR 4 |
| 5 | 6 |

FIG. 6B

EIGHT COLOR

| | |
|---|---|
| COLOR 1 | COLOR 2 |
| 3 | 4 |
| 5 | 6 |
| 7 | 8 |

FIG. 6C

FIG. 16A
Easy as ① ② ③
Pick Your Color
Our color runner lets you pick the color that's right for you.
Full Color Image
Meadow P-4884
C-5730
C-8500
C-10110
C-11500
C-12001
Pick Your Size
There are 9 avaiable sizes, made of durable nylon with a 5 year wear warranty. All rugs are easy to clean and maintain.
200
1'10"x5'4"
201
5'4"x7'8"
202
7'8"x10'9"
280
10'9"x13'2"
217
2'1"x7'8"
296
7'7"x7'7"
297
7'7"x7'7"
293
3'10"x5'4"
294
5'4"x7'8"
3
Purchase
See the sales associate to purchase the rug of your choice. All rugs are avaiable to ship within 7 days.

1920

*Milliken Rug Order Form 2002*

| | |
|---|---|
| BILL TO | SHIP TO |
| NAME· | ADDRESS |

| | | | |
|---|---|---|---|
| ADDRESS | | CITY | STATE & ZIP |
| CITY | STATE & ZIP· | SIDEMARK | ROUTING |
| P O # | SHIP DATE. | PART SHIP | DATE |

| SIZES | 3'10"x5'4" | 5'4"x7'8" | 7'8"x10'9" | 10'9"x13'2" | 2'1"x7'8" | 7'7"Round | 7'7"x7'7" | 3'10"x5'4" Oval | 5'4"x7'8" Oval | Color Runner |
|---|---|---|---|---|---|---|---|---|---|---|
| S/C | 200 | 201 | 202 | 280 | 217 | 296 | 297 | 293 | 294 | CR |
| PRICE | ---- | ---- | ---- | ---- | ---- | ---- | ---- | ---- | ---- | ---- |
| Uncarved | | | | | | | | | | |
| Carved | | | | | | | | | | |

| QTY | PATTERN # | COLOR # | SIZE CODES AVAILABLE | | | | | | | | | |
|---|---|---|---|---|---|---|---|---|---|---|---|---|
| | | | 200 | 201 | 202 | 280 | 217 | 296 | 297 | 293 | 294 | CR |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |

FIG. 19

MULTI-PATTERNED SURFACE COVERING SAMPLE ELEMENTS, DISPLAY SYSTEMS, AND METHODS

CROSS-REFERENCE TO RELATED APPLICATIONS

This application claims priority to and is a continuation-in-part of U.S. patent application Ser. No. 09/860,974, filed on May 18, 2001, now abandoned hereby incorporated by reference herein.

FIELD OF THE INVENTION

This invention relates to sample elements, display systems, and/or methods. Moreover, this invention relates to surface covering, such as a wall covering or floor covering, sample display elements, and more particularly to floor covering sample display elements, units or systems incorporating a multiplicity of design combinations across a common surface so as to reduce space requirements for the display of multiple available colors, patterns, and combinations thereof and/or such display elements, units or systems plus information relating to colors, sizes and/or shapes such as a hang tag. Also, certain embodiments of this invention may relate to methods, processes and/or systems of marketing, displaying, selling, and/or merchandising of products, such as surface covering, wall covering, or floor covering products, as well as improved methods, processes and/or systems. More particularly, at least certain particular embodiments of the present invention relate to carpet or rug display elements, units, systems or methods.

BACKGROUND

It is well known to utilize floor covering elements of substantially planar configuration for disposition across flooring surfaces. Such floor covering elements may include broadloom carpeting, carpet tile, mats, runners, rugs, and area rugs. In the trade, the term "area rugs" refers to free laying floor covering elements or products ranging in shape (rectangular, oval, circular, etc.) and size from relatively small dimensions to substantial size in the range of 12 ft.×15 ft. or greater.

In the traditional marketing of area rugs, respective samples with each sample embodying one of various available patterns and color schemes are typically arranged in a hanging orientation on respective swinging rack elements so as to permit a potential purchaser to examine a large number of available styles and patterns in relatively close proximity to one another. In recent years, the variety of available patterns and color schemes has increased, as manufacturing techniques have become more versatile. Accordingly, the options available to a potential purchaser have been correspondingly expanded. In particular, the number of available patterns has increased each of which may be available in a number of different color combinations. The number of possible choices is increased still further by the availability of border patterns of different styles and colorations which may be incorporated around a basic pattern if desired.

While the availability of a wide array of design combinations is believed to be beneficial to the consumer, the display of the various available options or combinations has proven to be problematic due to the cost and space requirements for a sufficient number of display racks to present each available combination.

As a possible resolution to this problem, it has been proposed to display area rug samples wherein one available color scheme is utilized within the interior portion of the sample area rug (display rug) and various alternative available bordering patterns are displayed in the form of separate attached smaller samples, pieces or corners. However, this sample display technique has the deficiency of requiring space allocation for the border sample elements. In addition, if the pattern for the main portion of the area rug is available in two or more colors, a corresponding number of samples are nonetheless still required to provide the potential purchaser with the ability to view those particular colors. Such combined area rugs and sample rugs or pieces form a substantial weight and bulk for each display rack. Also, it is difficult to attach multiple rugs or rug pieces (corners) to a single rack. Finally, the display system which utilizes sample rugs in combination with discrete samples of bordering patterns leaves open the possibility that the display rug itself may be intentionally or inadvertently sold to a perspective purchaser having an immediate desire for the article. Such a sale of the sample area rug may cause confusion and a lack of sales of that particular rug due to a potential purchaser's inability to pair the missing rug and the remaining discrete border pattern samples.

It is not uncommon for the sample area rug such as a 4 ft.×6 ft. or 6 ft.×9 ft. nominal size rectangular rug, to be sold when the inventory of that particular stock keeping unit (SKU) or product has been depleted. When the display rug is missing from the rack, sales of that particular rug can drop dramatically. It is not unheard of for a customer to purchase the display rug even though it has boltholes in it where it was bolted to the rack.

SUMMARY OF THE INVENTION

At least one embodiment of the present invention offers advantages and/or alternatives over the prior art by providing a surface covering display element such as an area rug sample display element which may be viewed by a potential purchaser and which incorporates across a common surface a multiplicity of available patterns and/or color schemes which may be selected for incorporation within an area rug or other surface covering, wall covering or floor covering article for purchase. A single sample rug or display element may best be used to convey visual information to a perspective purchaser which previously required two or more discrete sample units.

Moreover, virtually any number of combinations of patterns and/or coloration schemes may be incorporated into the single sample rug thereby providing the potential purchaser with the ability to simultaneously view various alternatives across a common surface without having to move physically from one display unit to another and thereby further enhancing the ability to select an appropriate and desirable color and/or patterning scheme. In addition, rug, base, SKU, design, bar code, color, and/or pattern reference numbers and/or other information (text and/or numbers) may be incorporated integrally within the sample rug in a coordinated arrangement with each of the different displayed regions thereby enhancing the accuracy of the ordering process once a desired color and pattern arrangement is selected.

These advantages are accomplished in a potentially preferred form of the invention by providing a multi-patterned rug sample or sample element embodying at least two different geometric designs and/or coloration schemes across a common surface. The display rug is preferably of a substantially full sized geometry such as a 6 ft.×9 ft. construction for display on a traditional sample rack (one side of the rack) although larger and smaller geometries may likewise be utilized if desired. The display rug also preferably includes integral display legends designating the patterns present in the various patterned regions to facilitate subsequent ordering of an area rug incorporating features of those defined regions.

In accordance with at least certain embodiments of the present invention, at least one sample display element such as a sample area rug or sample element is combined with other product information such as prices, shapes, sizes, bases, colors, finishes, edge treatments, and/or the like. Preferably, this increases the number of choices of options, combinations, products, or articles to the consumer or customer without increasing the space or weight required to display the product. For example, this additional product information is preferably provided on a hang tag, sheet, chart, page, brochure, or the like attached to the sample area rug. The consumer can look at and touch the sample display element to get an idea of the feel, size, shape and colors, and can then look at the hang tag to see other colors, sizes, shapes, and the like.

In accordance with one example, an area rug sample display element includes a large feature rug area, one or more additional color areas, and a hang tag which shows the rug in one or more different shapes and/or sizes. The area rug sample display element alone gives the consumer or customer at least four different choices of the featured rug (one pattern or design, two shapes or sizes, two different colors). The addition of the hang tag gives the consumer additional choices (size, shape, color) of the selected pattern or design (rug).

The sample display elements and the combination of the sample display elements and additional product information of at least selected embodiments of the present invention, provide for improved or enhanced methods, processes, and/or systems of marketing, merchandising, selling, displaying, ordering, and/or the like products or articles such as surface covering products, wall covering products, floor covering products, and the like. Also, the sample display elements and/or combination of sample display elements and additional product information provide for a more enjoyable and efficient shopping experience, facilitate special ordering of products, reduce space requirements for displaying products, maximize or increase sales per square foot of floor space, reduce the likelihood that a customer will purchase the sample display element, and/or the like.

BRIEF DESCRIPTION OF THE DRAWINGS

The accompanying drawings which are incorporated in and which constitute a part of this specification illustrate several potentially preferred embodiments of the present invention and together with the general description of the invention given above and the detailed description set forth below, serve to explain the principles of the invention wherein:

FIG. 3 is a surface plan view of an embodiment of an area rug sample display element according to one embodiment of the present invention;

FIG. 3A is a black and white copy of FIG. 3;

FIG. 4A is a black and white copy of FIG. 4;

FIG. 5 is a plan view of the surface of yet another embodiment of a floor covering sample display element according to the present invention;

FIG. 5A is a black and white copy of FIG. 5;

FIG. 6 is a plan view of the surface of still yet another embodiment of a floor covering sample element according to the present invention;

FIG. 6A is a black and white copy of FIG. 6;

FIGS. 6B and 6C are each schematic representations of respective 6 color and 8 color surface covering display elements (such as sample rugs);

FIG. 19 is a plan view representation of an exemplary order form in accordance with one embodiment of the present invention;

While the invention has been illustrated and generally described above and will hereinafter be described in connection with certain potentially preferred embodiments and practices, it is to be understood and appreciated that in no event is the invention to be limited to such illustrated and described embodiments and practices. On the contrary, it is intended that the present invention shall extend to all alternatives and modifications as may embrace the broad principles of this invention within the true spirit and scope thereof.

DESCRIPTION OF PREFERRED EMBODIMENTS

Figure 1:
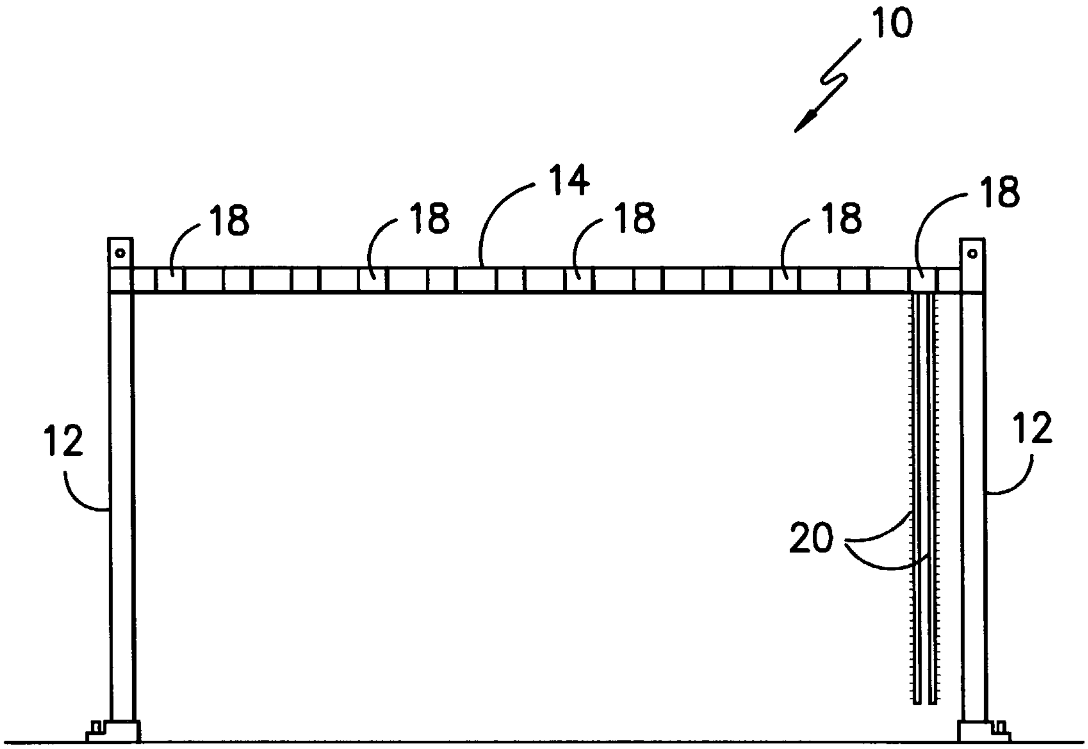
FIG. 1 is a representative side view of an exemplary area rug display rack.
Figure 2:
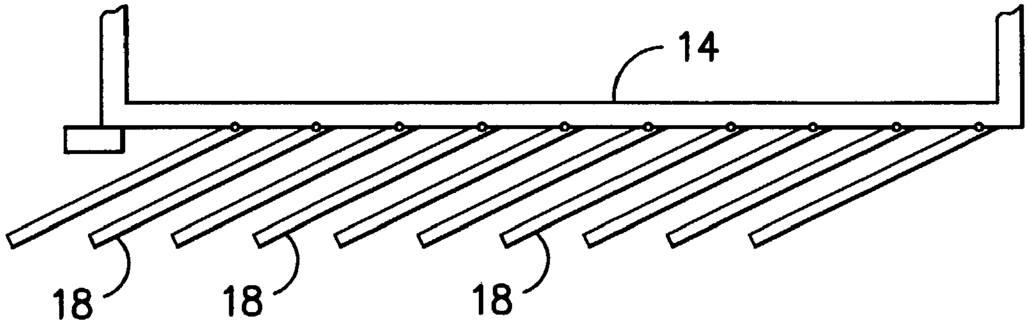
FIG. 2 is a top view of the display rack illustrated in FIG. 1.

Turning now to the drawings, in FIG. 1 there is illustrated a display rack 10 as may be used to display floor covering samples such as area rug samples in a purchase environment like a retail store, home center, carpet or flooring specialty store, or the like. As shown, the display rack 10 may include a pair of vertical posts 12 and at least one horizontal bar element 14 extending between the vertical posts 12. As illustrated in FIG. 2, a plurality of support rods, racks, or arms 18 project outwardly away from the horizontal element 14. The support rods or arms 18 are preferably hingeable or rotatable relative to the horizontal bar element 14 so as to permit support rods 18 adjacent to one another to be hingeably separated in opposing directions thereby opening a viewing space between such adjacent support rods 18. In practice, a rug sample 20 may extend downwardly away from either side of each support rod, rack, or arm 18 such that each support rod 18 carries two, oppositely facing, rug samples 20. Each of the rugs or samples 20 may be attached to one side or half of the rod, rack or arm 18 by, for example, clips, bolts, clamps, or the like.

Although only two rugs, elements, units, or samples 20 are shown in FIG. 1, it is to be understood that in normal use, each of the rods, arms or racks 18 of display 10 may support two samples, units, carpets, or rugs 20. One can calculate the total square footage of floor space (foot print) taken up by the display 10 and can divide this total square footage by the number of products (SKUs, options, combinations) displayed to come up with a number of products displayed per square foot of floor space factor. Also, one can calculate the number of products shown per arm or per side of an arm.

While the display 10 as illustrated represents one exemplary embodiment, it is to be understood and appreciated that the present invention is in no way to be limited to any particular embodiment of display or racks. To the contrary, it is contemplated that the present invention is useful in any display environment without regard to the actual means of display. For example, rugs may be displayed in drawers, shelves, or slides. Accordingly, the display rack 10 as illustrated and described is to be understood to be exemplary only and in no way limiting to the present invention.

Regardless of the actual construction of the display 10 or supports 18, in the past, sample rugs have typically been displayed in the form in which they are actually to be purchased and used. That is, the rug sample 20 has typically corresponded substantially to the rug which the purchaser is ultimately sold. However, such a display practice necessitates the allocation of sufficient space to house individual rug samples 20 corresponding to each available pattern and/or coloration scheme. As the number of available patterns and coloration schemes increases, so too does the space required to present corresponding samples.

For example, in the past, if a display had 10 arms, each arm held two sample rugs, to provide for the display of 20 sample rugs. If the display took up 72 square feet of floor space, then the product displayed per square feet of floor space factor is only 20 divided by 72 or about 0.28. If two surface covering sample display units of the present invention (like unit 320 of FIG. 3) are placed on each rack or arm 18 of a 10 rack display 10, and the display 10 takes up 72 square feet of floor space, then the product displayed per square foot factor is at least 7 times 20 divided by 72 or 1.94. The higher the product displayed per square foot factor the better. In other words, the greater the number of products one can display per square foot, the more opportunity for sales per square foot of display space.

As will be appreciated, area rugs may incorporate either a substantially uniform pattern across their surface or may utilize a combination of patterns, colors, finishes, edge treatments, borders, and the like to achieve desired aesthetic characteristics. The most simple uniform pattern across the entire surface is a single solid color or heather extending across substantially the entire surface of the area rug. A substantially repeating geometric pattern such as a floral pattern or the like may also extend in a substantially uninterrupted manner across the entire surface.

In many area rugs, a substantially solid color pattern or a repeating geometric pattern or design may extend across the interior of the rug surrounded by color coordinated frame or border colors and/or patterns. The coordinated presentation of the bordering patterns in conjunction with the interior portion has a substantial influence upon the final appearance of the rug in the environment of use. Further, the interior may include one or more additional patterns, designs, or colors. In this regard, for any given interior pattern, it has been found that relatively minor changes in the coloration of the bordering patterns may give rise to fairly substantial changes in the final overall appearance of the rug. Also, changes in the size or shape of the rug can dramatically affect the look of the rug.

In a first exemplary embodiment of the invention as illustrated in FIG. 3, a surface covering display unit such as a sample rug or area rug sample 320 is provided which incorporates across its show surface a representative pattern or design portion 322 which provides the viewer with an understanding of the character and arrangement of the various pattern elements in the full rug. In the illustrated embodiment, the representative pattern portion 322 includes a major interior pattern portion 324 and a boundary portion 326. A plurality of alternative pattern portions 328 are present on the same surface or substrate as the representative pattern portion 322. As illustrated, the alternative pattern portions 328 may display corners of various available rug patterns or designs incorporating the alternative patterns or colors so as to facilitate an understanding of relative spatial orientation of design components by the viewer.

In accordance with the exemplary sample unit 320, there are shown 7 different patterns, designs or colorations (Lapis, Rose Quartz, Garnet, Sandstone, Wheat, Dark Amber, Amethyst). The sample unit 320 gives a consumer the look and feel of the Lapis area rug, the true or actual color of the 7 different colorations, and gives the consumer at least 7 different choices of products to choose from rather than a single choice provided by a single display or feature rug.

Figure 16:
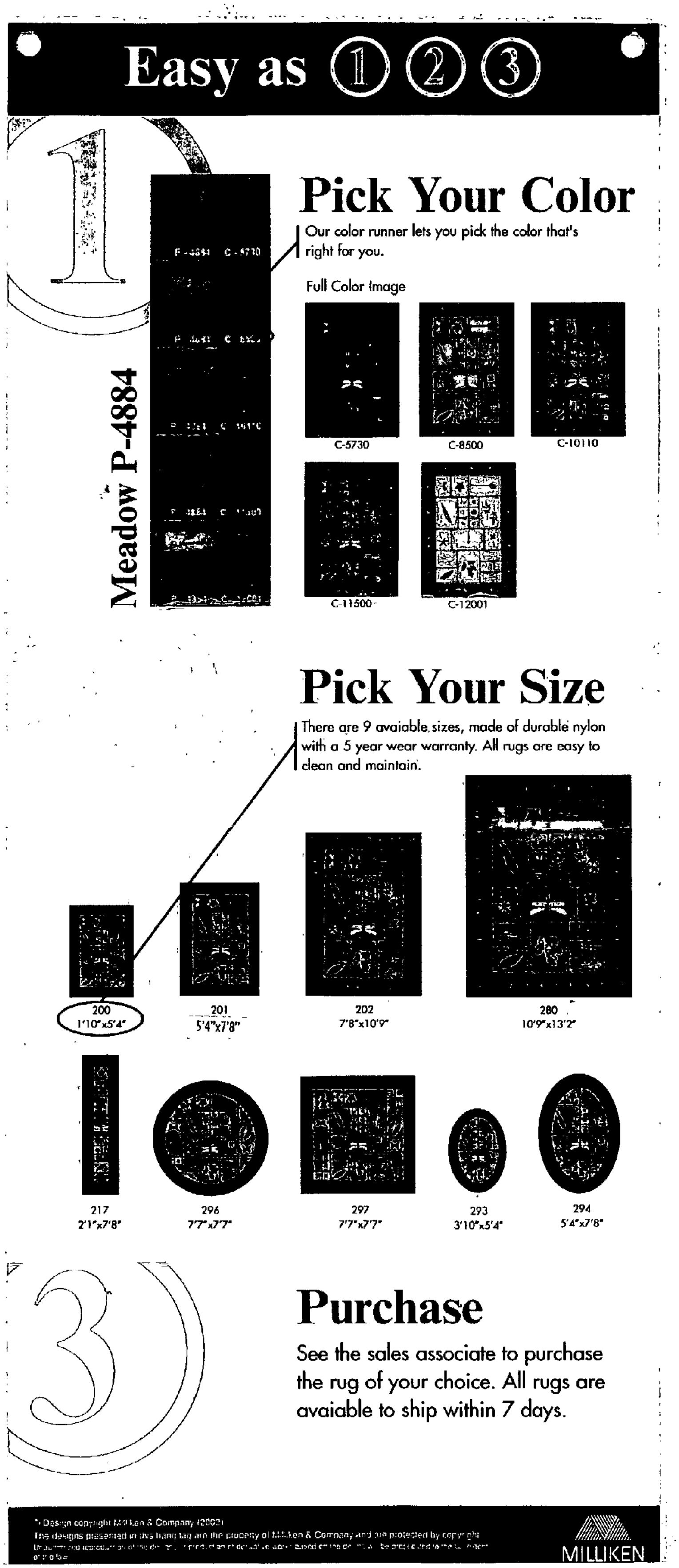
FIG. 16 is a plan view representation of additional product and/or ordering information such as a hang tag in accordance with an exemplary embodiment of the present invention.
Figure 16A:
FIG. 16A is a black and white copy of FIG. 16.
Figure 17:
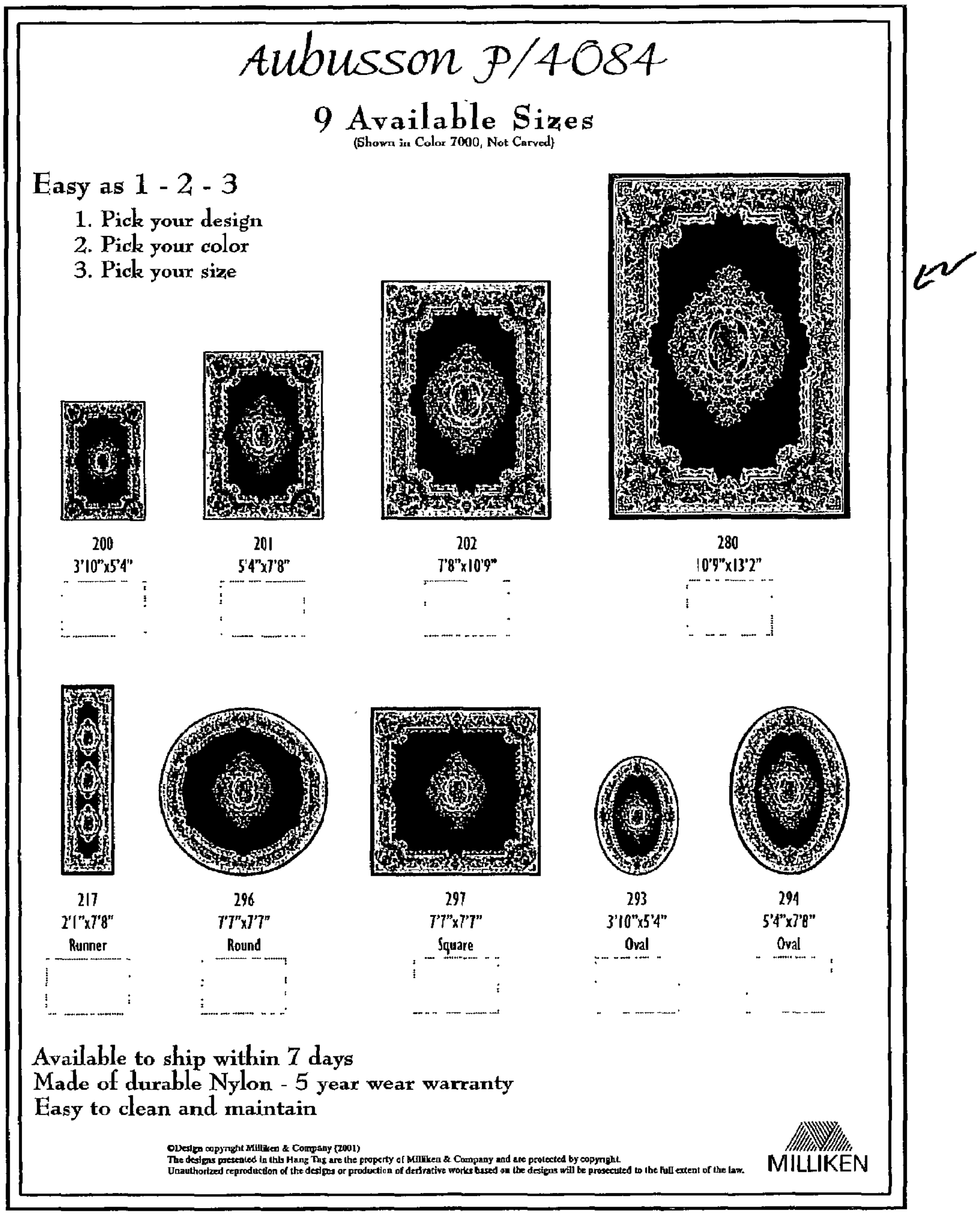
FIG. 17 is a plan view representation of a hang tag in accordance with another embodiment of the present invention.
Figure 17A:
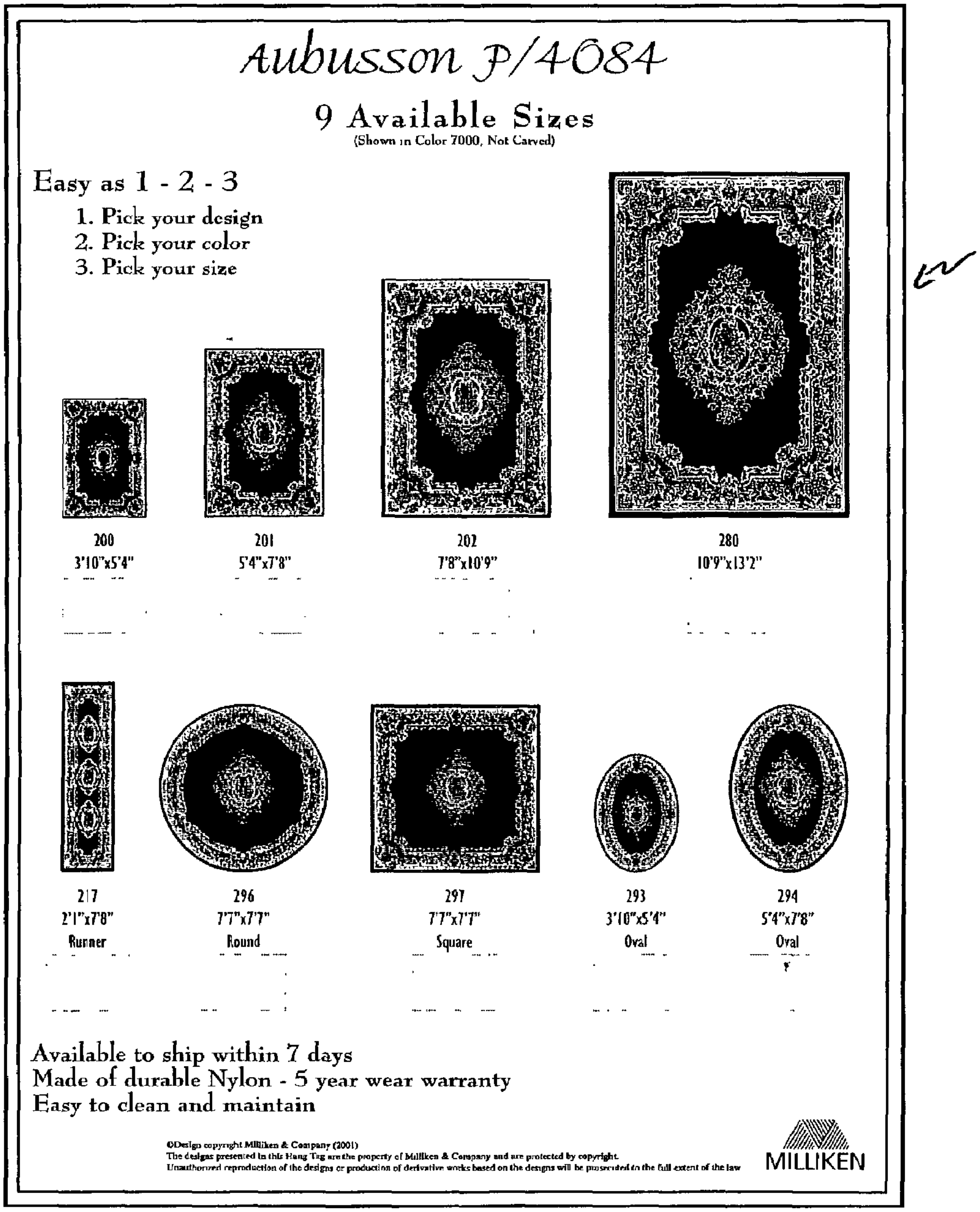
FIG. 17A is a black and white copy of FIG. 17.
Figure 18:
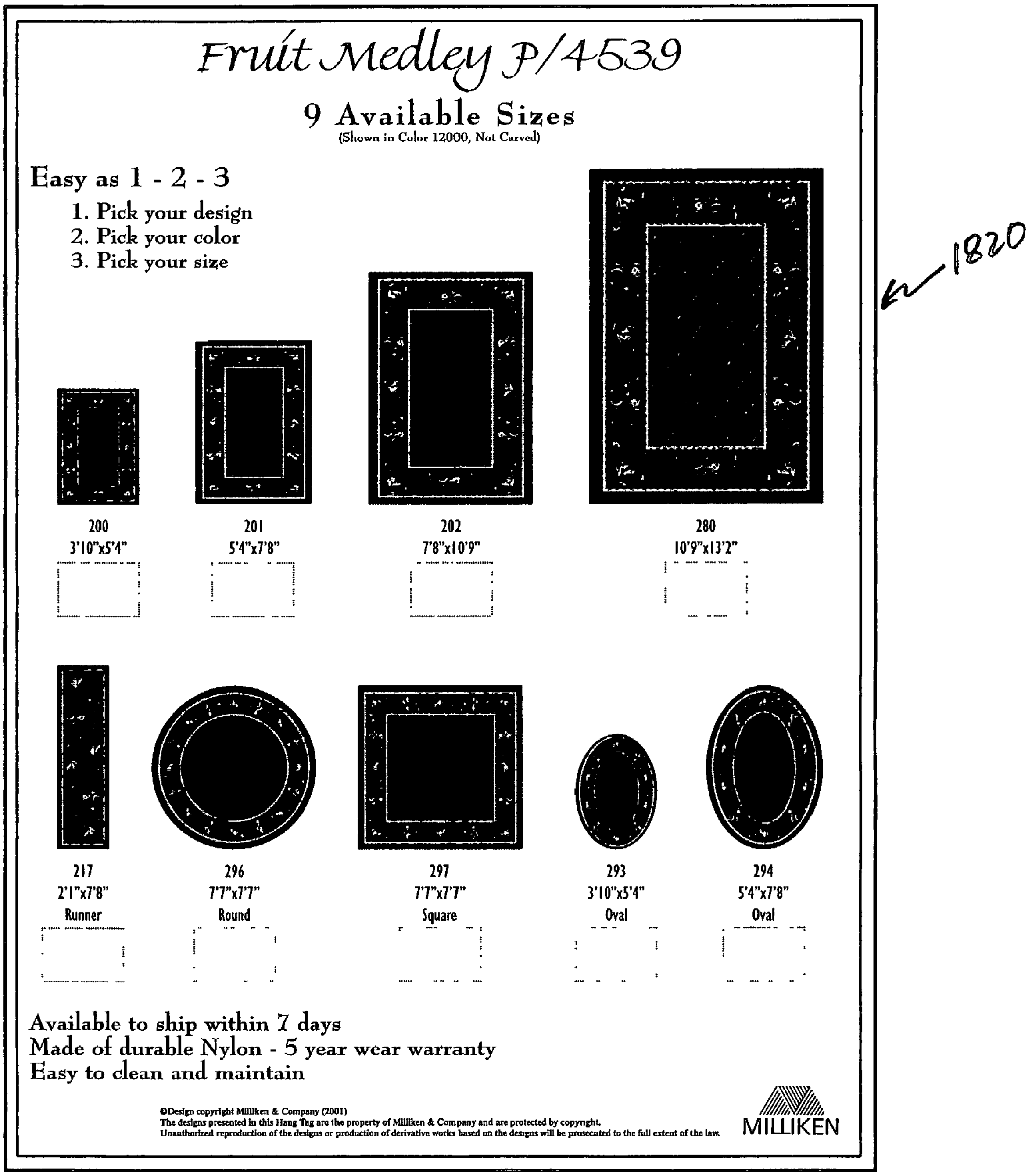
FIG. 18 is a plan view representation of another embodiment of a hang tag like that of FIG. 17.
Figure 18A:
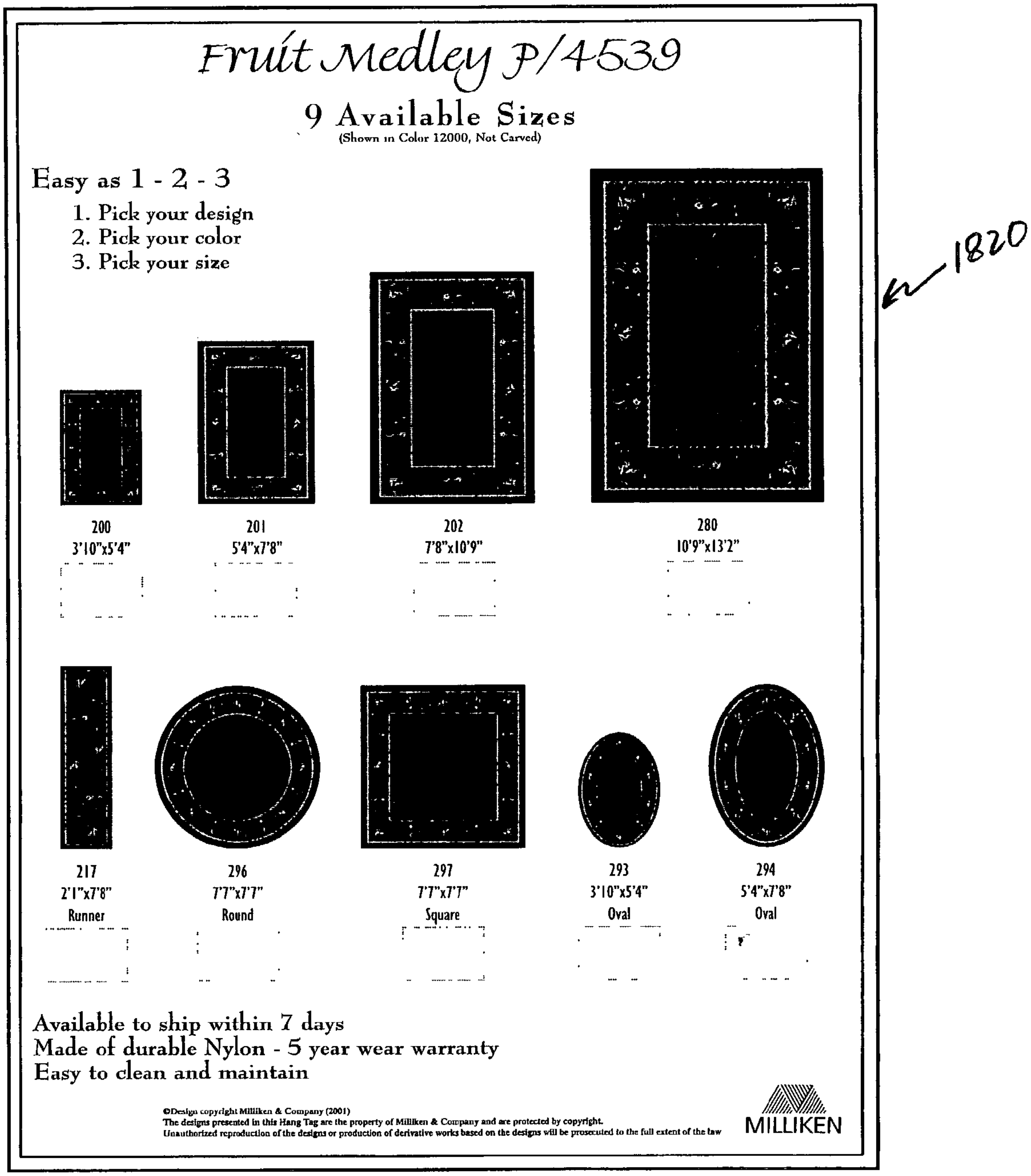
FIG. 18A is a black and white copy of FIG. 18.

If the sample unit 320 is combined with additional product and/or ordering information such as hang tags as shown in FIG. 16, 17 or 18, such as point of purchase (POP) hang tags, providing available shape and/or size information, then the consumer has many more choices per sample unit 320, per square foot of floor space, per rack, per side of support arm, per sample rug, etc. For example, 7 different colorations (patterns) times 9 different shapes or sizes gives 63 product choices per sample unit 320. Hence, the present invention can provide a multiplier effect of product choices per sample unit. It is preferred that the sample unit 320 provide two or more colorations (patterns), more preferably three or more colorations, most preferably 6 or more colorations (a feature rug portion plus at least one additional coloration portion).

Although the sample units or rugs of the present invention are especially well suited to be produced by printing or dyeing the colors, patterns, designs, text, and the like on a printable or dyeable base (cut pile, loop pile, tufted, bonded, woven, knit, etc.), such as by jet dyeing the colors, patterns, designs, text, and the like on a white yarn, cut pile tufted base using a Millitron® jet dye machine marketed by Milliken & Company of LaGrange, Ga., it is to be understood that the sample units or sample rugs of the present invention may be produced by weaving or tufting of pre-dyed or colored yarns, such as by hand tufting, graphics tufting, weaving, and the like.

Printing or jet dyeing of the sample units or sample rugs of the present invention provides for mass production economics of manufacture (can be printed or dyed in broadloom form one after another or nested and then cut into separate units or rugs) and allow for one of (single items), no minimum order of rugs, and can provide for no inventory, special order, and shipment of product direct to customer, retailer, dealer, or the like within 24 hours, 3 days, 7 days, or the like. Also, the sample unit or rugs of the present invention avail themselves to a total special order no inventory system, a mixed inventory and special order system, or a total inventory system where all of the product choices are available from stock.

According to the illustrated and potentially preferred practice, the rug sample element 320 is a unitary structure formed by appropriate formation and patterning techniques. In this regard, it is contemplated that the alternative pattern portions 328 may be applied by patterned color tufting or weaving techniques, inlaying techniques, dyeing, and/or printing techniques. It is contemplated that dyeing or printing techniques may be particularly useful. Such printing techniques may include by way of example, screen printing, jet dye printing, transfer printing, and combinations thereof. Jet dye printing utilizing a plurality of fine dimension dye jet streams may be particularly preferred. Regardless of the mechanism utilized to apply the array of patterns across the rug sample element 320, the final resulting construction provides a potential purchaser with a view of multiple available combinations of coloration and/or geometric patterns (available products) which would otherwise have to be displayed on two or more separate rugs.

As illustrated, according to the potentially preferred practice, both the representative pattern portion 322 as well as each of the alternate pattern portions 328 is preferably designated by a readable identifying legend 340. The identifying legend 340 may be in either machine readable or human readable form. Human readable form may be potentially preferred to facilitate the placement of orders by retail customers.

Figure 4:
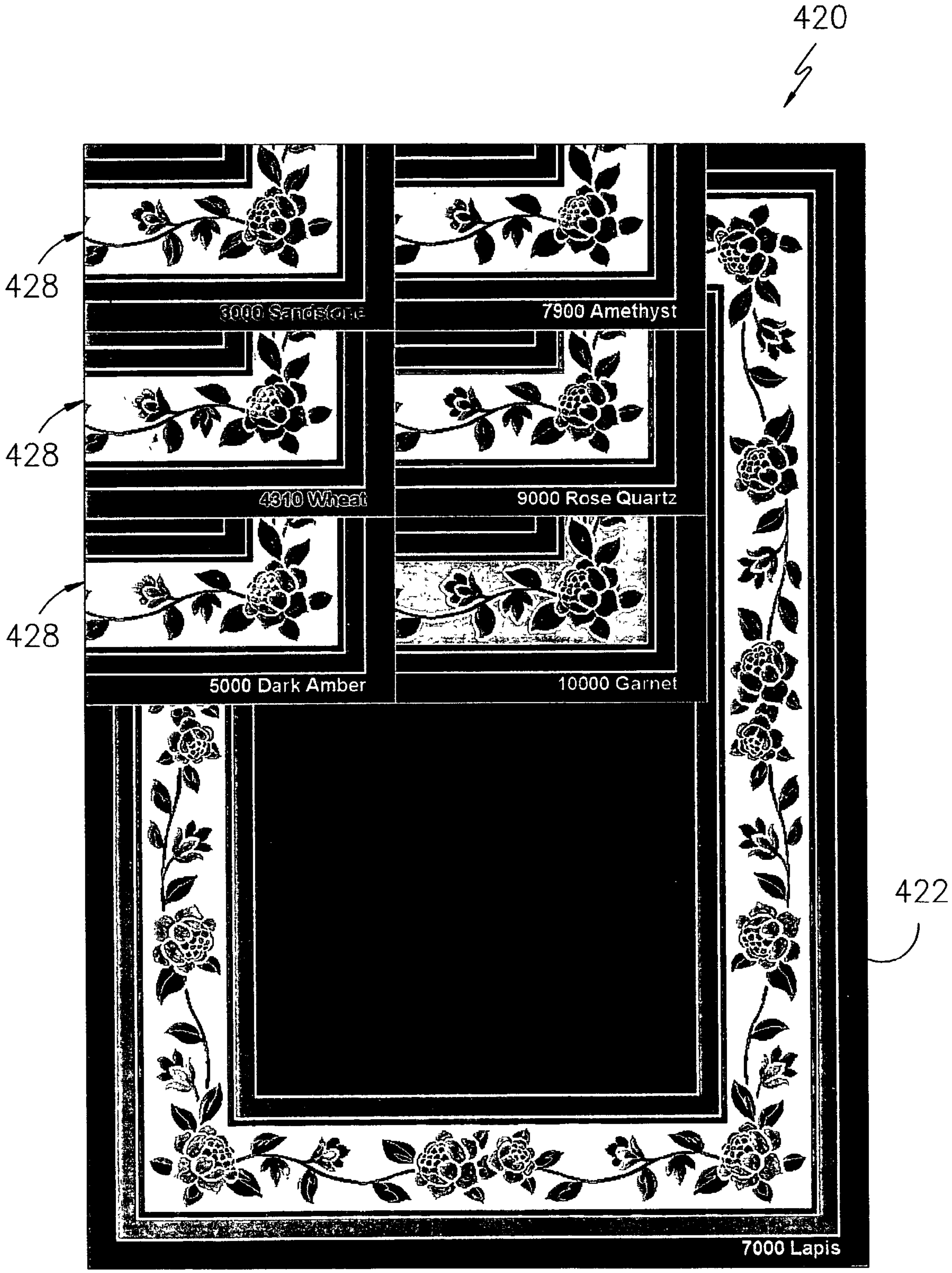
FIG. 4 is a plan view of the surface of another embodiment of a floor covering sample display element according to the present invention.

It is to be appreciated that the present invention permits various pattern portions to be disposed across the surface of the rug sample element 320 according to a wide variety of arrangements. In FIG. 4, a rug sample element 420 is illustrated wherein the alternate pattern portions 428 are arranged across the upper portion of the rug sample element 420 and the representative pattern portion 422 is disposed below and to the side of the arranged alternate pattern portions 428.

According to another potentially preferred embodiment of the present invention illustrated in FIG. 5, a rug sample element 520 may be patterned to include a representative pattern portion 522 including an interior pattern portion 524 and a boundary portion 526. In this embodiment, one or more alternate pattern portions 528 including interior portion 524' and boundary portions 526' are arranged around at least a portion of the perimeter of the rug sample element 520 so as to provide the appearance of substantial continuity of the boundary portion 526 while nonetheless exhibiting a plurality of possible patterning combinations preferably (in a single sample rug).

In FIG. 6 there is illustrated yet a further alternative embodiment of the present invention wherein a rug sample element 620 is subdivided into a plurality of substantially discrete pattern portions 650, 652, 654, 656 disposed in a coordinated pattern across the surface of the rug sample element 620 such that each pattern portion occupies one quadrant of the rug sample element 620. According to the illustrated embodiment, each of the substantially discrete pattern portions 650, 652, 654, 656 defines a substantially discrete pattern and/or color combination while simultaneously cooperatively defining a portion of an entire rug structure. As will be appreciated, while the rug sample element 320 illustrated in FIG. 6 incorporates four substantially discrete pattern portions 650, 652, 654, 656 such segmentation may result in either a greater or lesser number of discrete pattern portions if desired. Accordingly, by way of example only, and not limitation, it is contemplated that the rug sample element 620 may include as few as two substantially discrete pattern portions or any odd or even number in excess of two as may be desired and necessary to represent various patterning and/or color options including by way of example only, an arrangement of six or eight pattern portions as shown schematically in each of FIGS. 6B and 6C, respectively.

Figure 7:
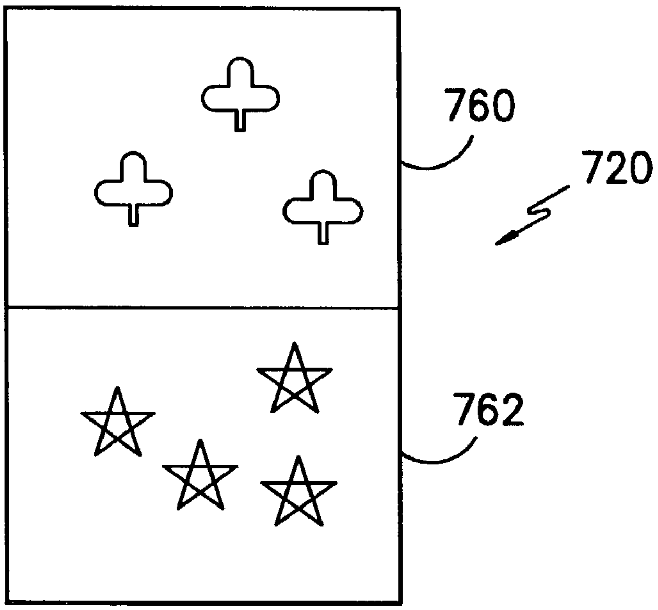
FIG. 7 is a schematic plan view which illustrates a geometric arrangement for the display of two substantially different patterned regions within a single sample display element.

While each of the embodiments illustrated in FIGS. 3-6 illustrate rug sample elements used to display alternative coloration schemes applicable to common patterns, it is also contemplated that a single rug sample element according to the present invention may incorporate two or more substantially different patterns either in the same or different color schemes. Such an embodiment is illustrated in representative manner in FIG. 7 wherein a single rug sample element 720 incorporates a first segment 760 and a second segment 762. The pattern across the first segment 760 is distinct from the pattern across the second segment 762.

Figure 8:
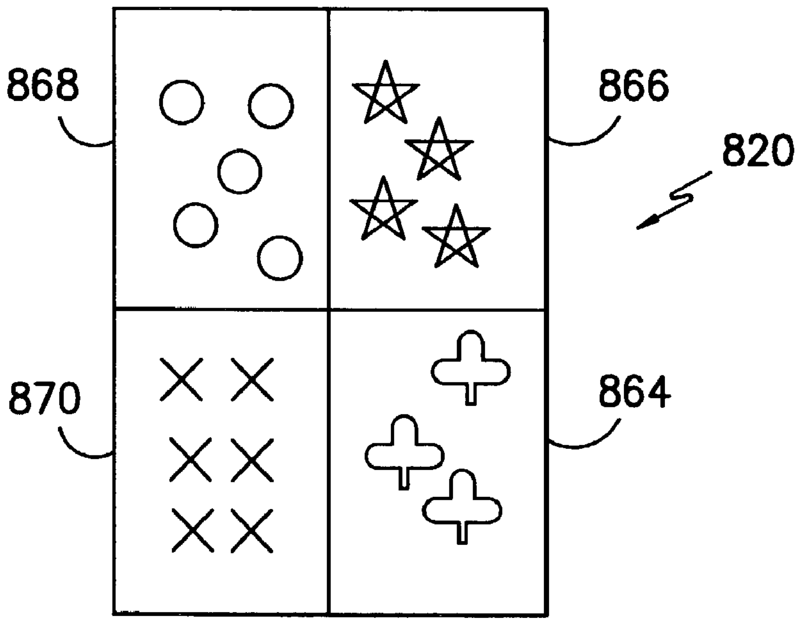
FIG. 8 is a schematic plan view which illustrates a geometric arrangement for the display of four discrete patterns within a single sample display element.

In FIG. 8 a further representative illustration of the ability to provide a multiplicity of patterns across a single rug sample element 820 is illustrated wherein four substantially discrete pattern portions 864, 866, 868, 870 are provided. Of course, it is likewise understood that any greater or lesser number of pattern portions may also be utilized.

Figure 9:
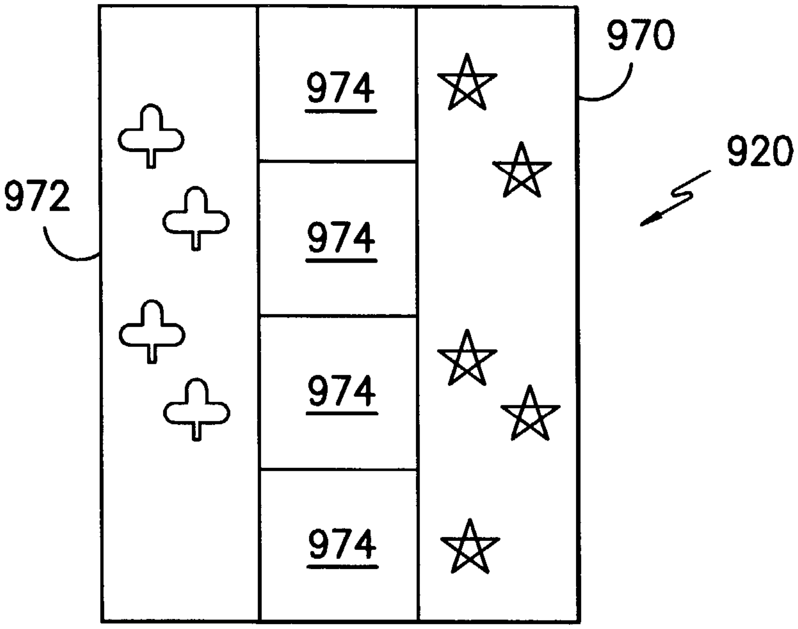
FIG. 9 is a schematic plan view which illustrates a geometric arrangement for the display of two different major pattern elements or colors and available auxiliary pattern elements within a single sample display unit.

As illustrated in FIG. 9 and in accordance with one embodiment of the present invention, a rug sample element 920 may be provide wherein discrete pattern portions 970, 972 may be arranged across the surface of the rug sample element 920. In addition, one or more auxiliary pattern portions 974 may be disposed in an arrangement across the surface of the rug sample element 920. It is contemplated that such an arrangement may be particularly useful in the event that the auxiliary pattern portions 974 are commonly available for both the discrete pattern portions 970, 972.

Figure 10:
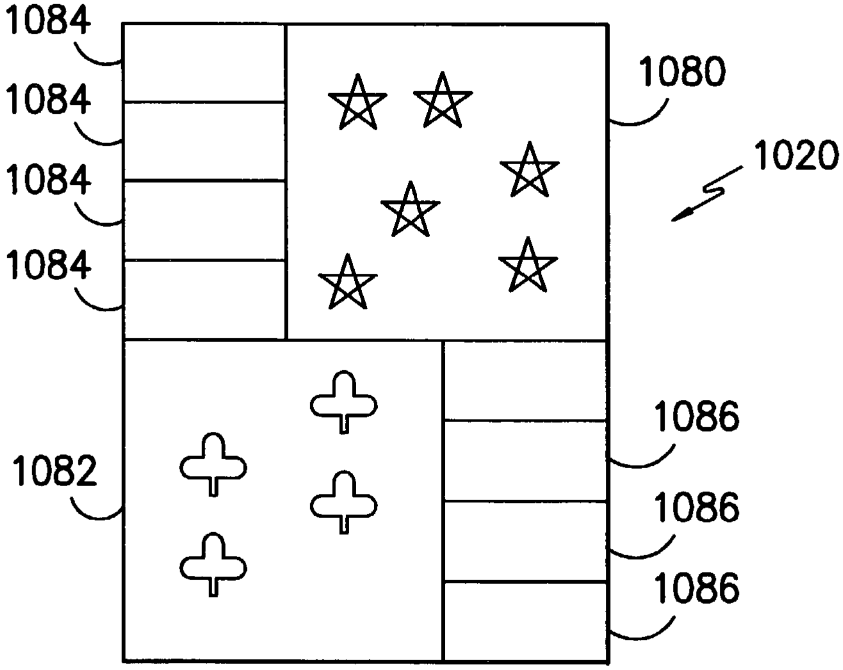
FIG. 10 is a schematic plan view which illustrates a geometric arrangement for the display of multiple major pattern elements (or colors) and dedicated auxiliary pattern elements associated with each of the major pattern elements within a single sample display unit.

The present invention also enables the presentation of a number of discrete pattern portions and affiliated auxiliary pattern elements within a common structure. One such arrangement is illustrated in representative fashion in FIG. 10. In the embodiment illustrated in FIG. 10, a rug sample element 1020 is provided including a first pattern portion 1080 and a second pattern portion 1082 having a substantially different pattern. A plurality of auxiliary pattern portions 1084 available for use in conjunction with the pattern present across the first pattern portion 1180 are disposed adjacent to the first pattern portion 1180. Likewise, a plurality of auxiliary pattern portions 1186 available for use in combination with the pattern displayed within the second pattern portion

1182 are disposed adjacent to the second pattern portion 1182 for use in the selection of an appropriate combination of patterning elements.

Figure 11:
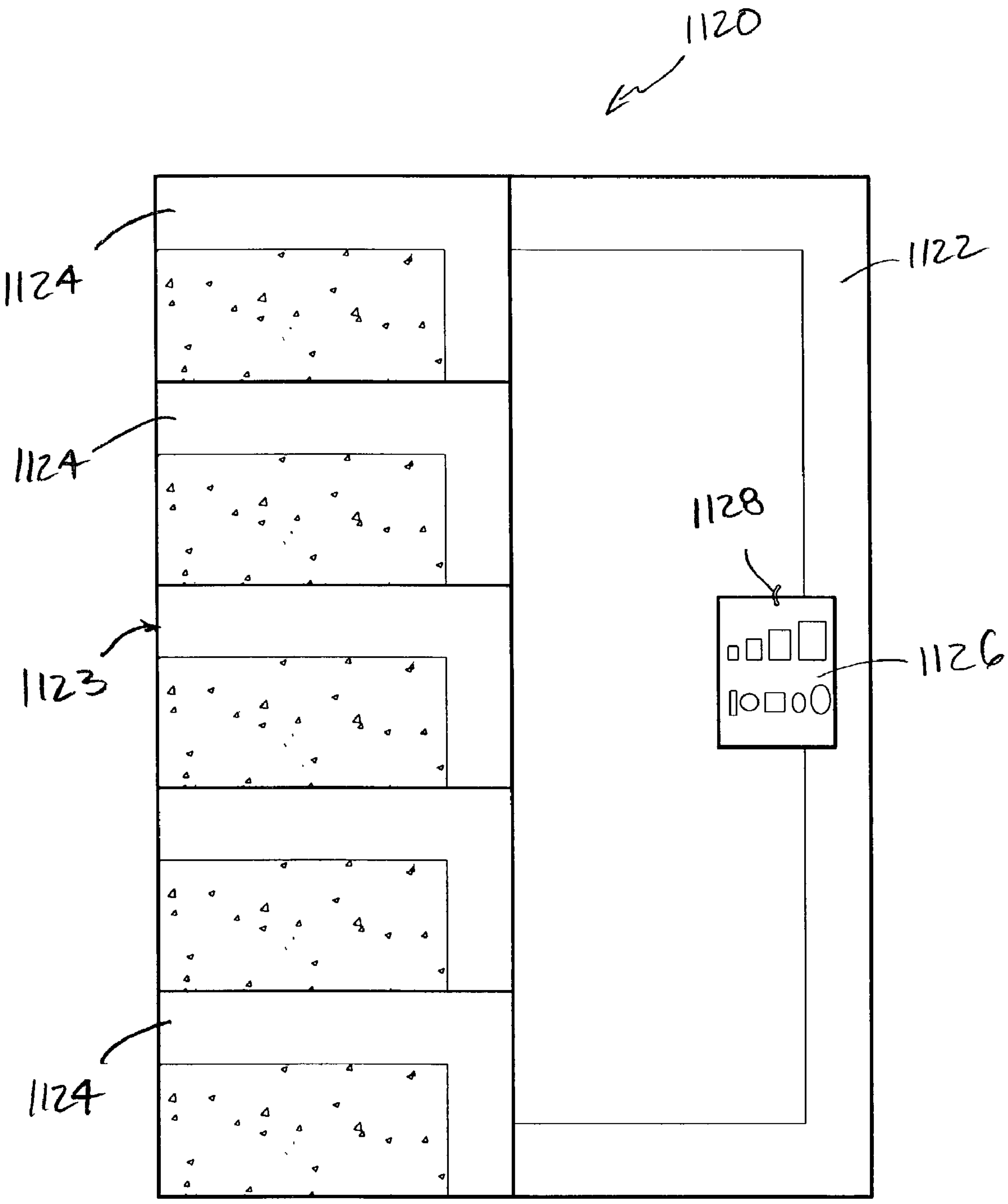
FIG. 11 is a schematic plan view illustration of an exemplary sample display unit like that of FIG. 3 with the addition of a hang tag like that of FIG. 17 or 18.

In the exemplary embodiment shown in FIG. 11, a display unit or system 1120 includes a feature rug portion (representative pattern or design portion) 1122, a color runner portion 1123 made up of a plurality of alternative pattern portions 1124, and a hang tag 1126 attached to the feature rug portion 1122 by a loop, ring, cord or tie 1128. The feature rug portion 1122 and color runner 1123 provide at least 6 different coloration or pattern (product) options. The hang tag 1126 as shown provides at least 9 different shapes or sizes. Hence the display unit or system 1120 provides for at least 54 different product options or SKUs to a consumer, potential customer, retailer, or the like. Also, it is contemplated that the sample unit, element or system 1120 is a particular SKU in of itself that a dealer, retailer, distributor, or the like can order as needed.

Figure 12:
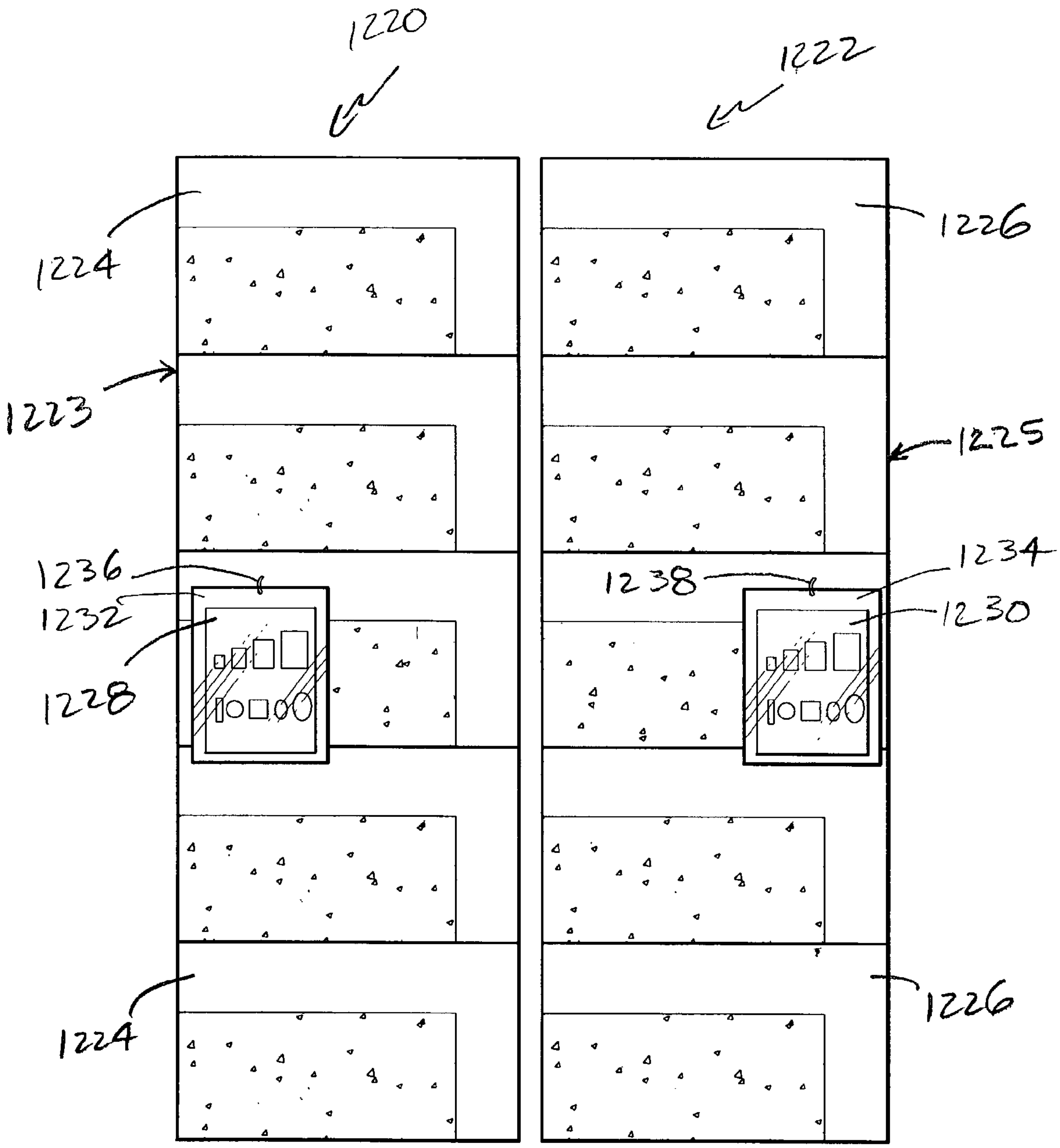
FIG. 12 is a schematic plan view representation of two side by side sample display units in the form of runners each with five different colorations or patterns and each combined with a respective hang tag placed in a transparent cover or pouch.

With reference to FIG. 12, there are shown two different sample units or systems 1220 and 1222 each including a color runner or rug 1223, 1225 made up of a plurality of alternative pattern portions 1224, 1226, and a hang tag 1228, 1230, in a transparent cover or pouch 1232, 1234, attached to the runner or rug by a clip, ring, cord, tie, or the like 1236, 1238.

The color runners or rugs 1223, 1225 are preferably sized so that the two runners can fit on one side of a single rack or arm of a display. Thus, the consumer has 10 different colorations, patterns, designs, or options presented by the runners themselves and with 9 different sizes and/or shapes presented by each hang tag, then the combination of units or systems 1220 and 1222 provide 90 different SKUs, options or products to the consumer. It is readily appreciated that 90 different SKUs per half of a rack in a display is quite a dramatic improvement over one SKU. Also, it is less likely that a customer will buy the color runner (than a feature rug) and leave the rack empty of half empty. If, however, the customer or dealer wants to buy the color runner 1223 or 1225, the runner can be ordered or stocked and sold just like an area rug.

Figure 13:
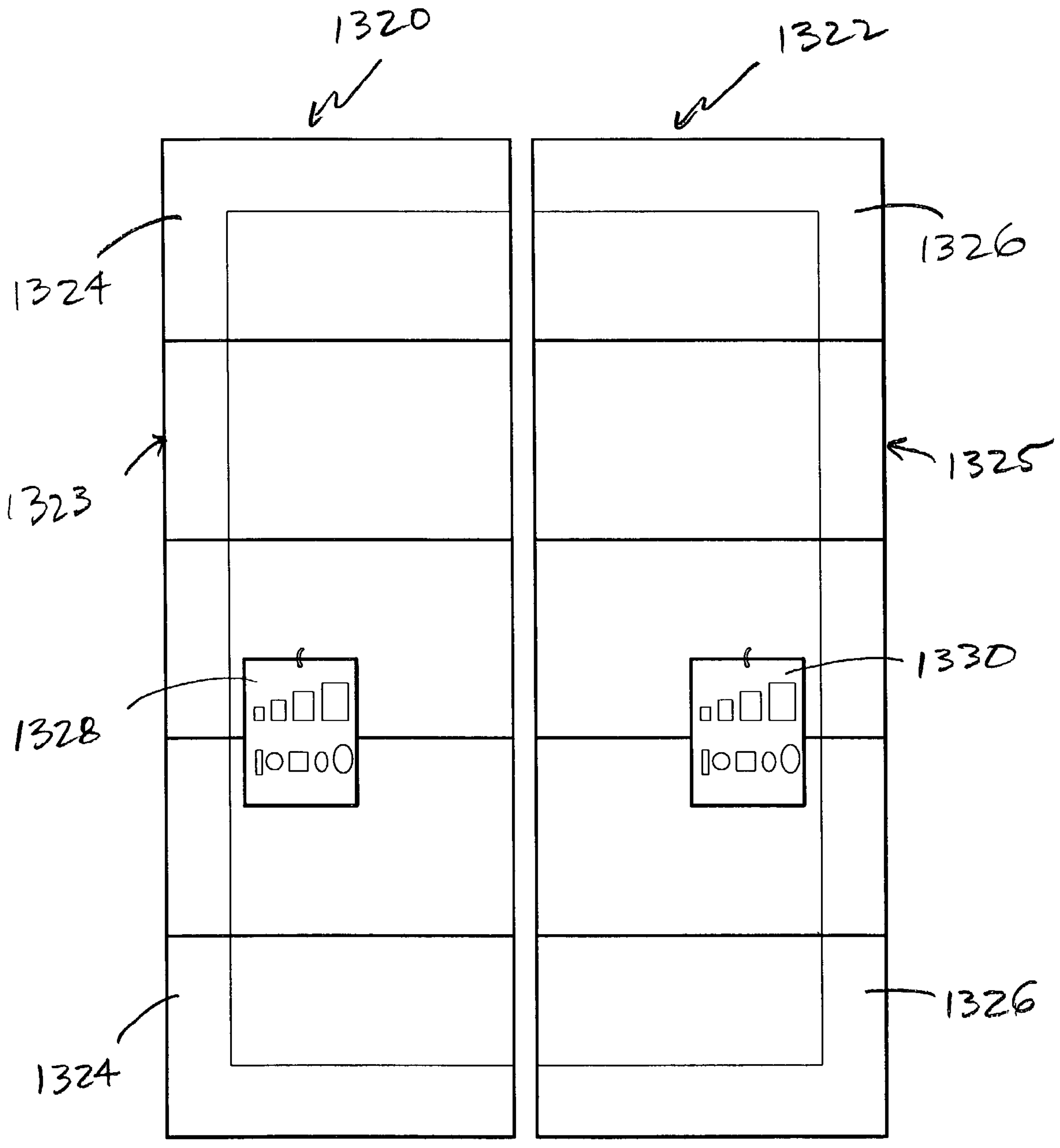
FIG. 13 is a schematic plan view representation of two separate sample units and hang tags like that of FIG. 12 except that the sample display units (runners) combine to form substantially an entire area rug with ten different color choices.

As shown in FIG. 13, a pair of sample units or systems 1320 and 1322 (like the systems 1220, 1222 of FIG. 12) include respective color runners or rugs 1323, 1325, each including a plurality of alternative pattern portions 1324, 1326 (like pattern portions 528 of FIG. 5), and hang tags 1328, 1330. The color runners 1323, 1325 are preferably each one-half of an area rug and yet provide as shown 10 different color, pattern, or design options to the consumer. Together, the units 1320, 1322 form a display system of a plurality of color runners and hang tags which provide a multitude of SKU, product, or combination options to the consumer, customer, retailer, or the like. Also, it is less likely that a consumer will purchase one of the color runners 1323, 1325 and leave the rack empty or half empty.

Although it is preferred that there be a plurality (two or more) of color runners 1223, 1225, 1323, 1325 per rack or arm in a display, it is contemplated that a single runner or rug may provide two or more SKUs or options and when combined with a hang tag may provide three or more options or SKUs to the shopper, consumer or purchaser.

Even though the hang tags 1126, 1228, 1230, 1328, 1330, 1530, 1620, 1720, 1820, and 2226 show 9 different sizes and/or shapes (4 rectangles, 1 runner, 1 square, 1 round, 2 ovals), it is to be understood that any plurality of different sizes, shapes, finishes, edge treatments, bases, backings, shipment options, payment options, or combinations thereof provide the consumer or customer with a multitude of product or SKU options within the spirit and scope of the present invention. It is preferred that the hang tag or other additional product and/or ordering information give the consumer or customer at least two product or SKU options, more preferably at least three, and most preferably at least six or more.

For example, it is easy to envision adding additional options such as another rectangle, another runner, another round, another square, another oval, an ellipse, a hexagon, an octagon, a triangle, a diamond, and/or the like.

In accordance with one particular example of the present invention, 12 different color runners and associated hang tags are placed on each arm (6 on each side) of a large display rack, each runner having 5 different alternative pattern portions, and with each hang tag providing 9 different size and/or shape options, provides a consumer with 540 different SKUs or products to choose from per arm (270 SKUs or products per side of the arm).

Figure 14:
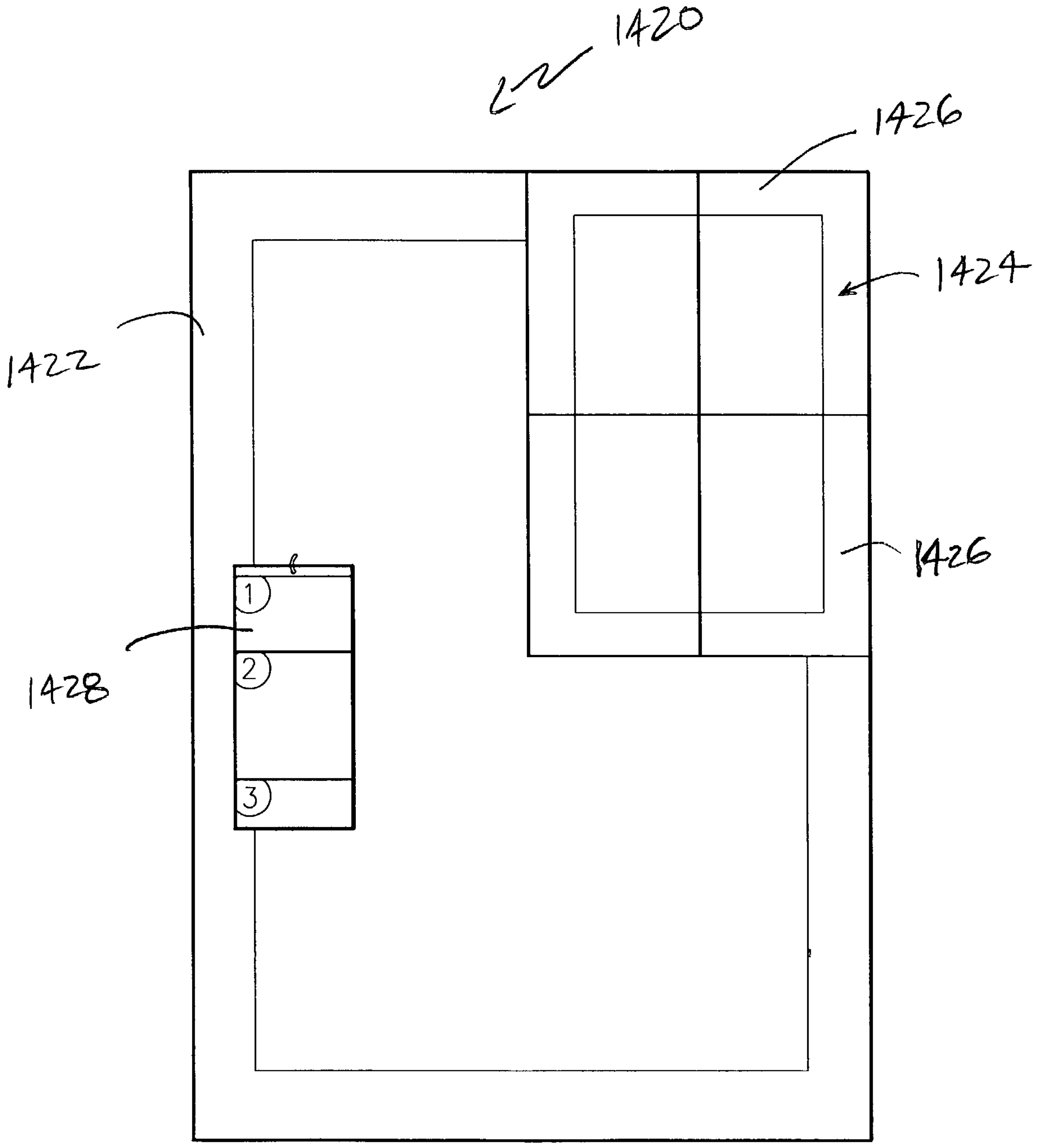
FIG. 14 is a schematic plan view illustration of a rectangular sample display unit having a feature rug area, a four color smaller sample rug area, and a hang tag like that of FIG. 16 attached thereto.

With reference to FIG. 14, there is shown another alternative display unit or system 1420 including a large feature rug portion 1422, a smaller color option rug portion 1424 having a plurality of alternative pattern portions 1426, and a hang tag 1428 (like that of FIG. 16) attached to the feature rug portion 1422 (alternatively the hang tag may be attached to the color rug portion 1424). The unit or system 1420 operates in the same fashion as units 1120, 1220, 1222, 1320, and 1322 in that it offers the shopper, consumer or purchaser the opportunity to see and feel the feature rug, to see the actual or true color options, and to select from a plurality of shapes, sizes, bases, finishes, prices, and/or the like. As shown, unit 1420 offers at least 5 or more different SKUs or products per one-half rack or arm of a display. Also, if feature portion 1422 and color rug portion 1424 are each separate rugs (feature rug and color rug), they may be ordered or purchased from stock or inventory. If the feature rug is purchased, the hang tag 1428 may be moved to the color rug 1424.

Figure 15:
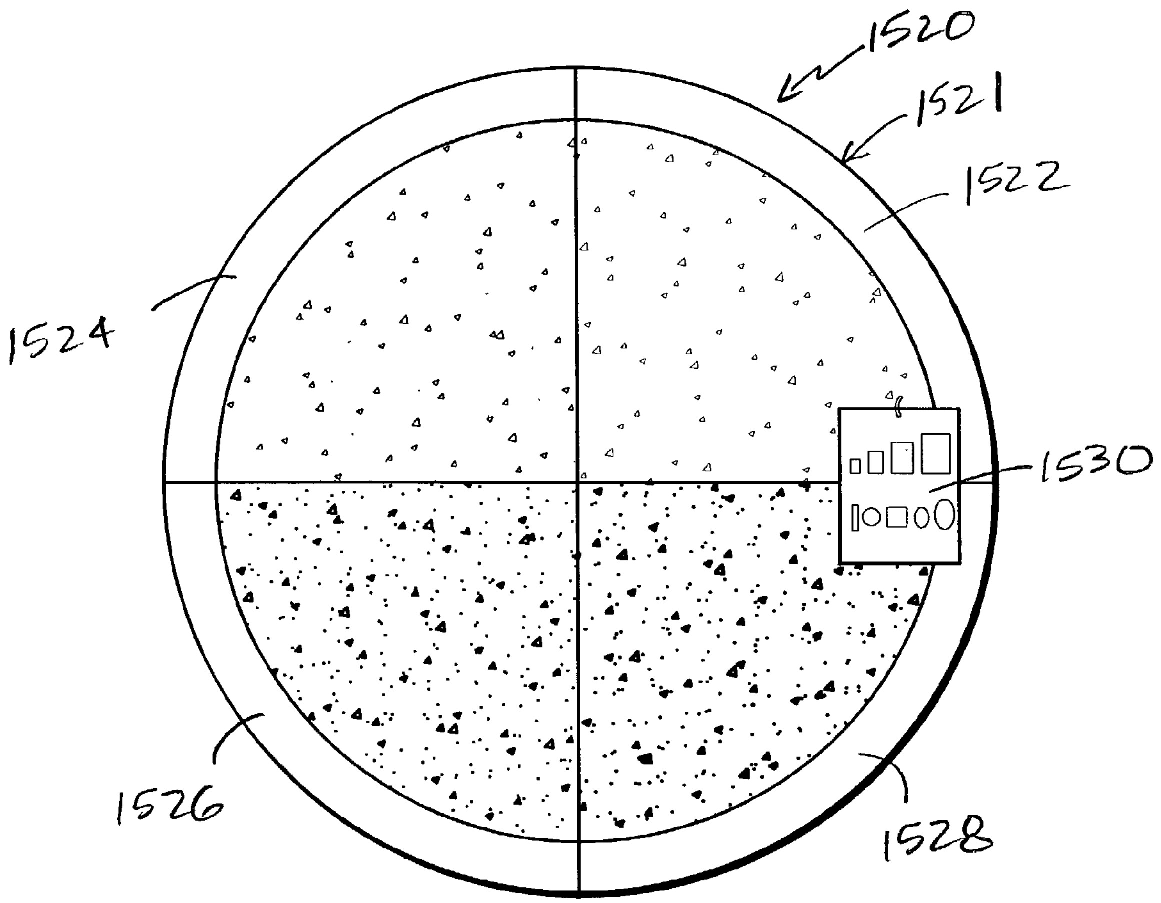
FIG. 15 is a schematic plan view of a round sample display unit having four different color or pattern elements and a hang tag attached thereto.

As shown in FIG. 15, a sample unit or system 1520 includes a round sample rug 1521 having a plurality of different alternative pattern portions 1522, 1524, 1526, 1528 and a hang tag 1530 attached thereto. The hang tag may be releasably or permanently attached or affixed to the rug 1521. As shown, the unit or system 1520 provides at least 36 different SKUs or options to the consumer (37 different options if they can purchase the rug 1521, 45 different options if they can select each of the 9 sizes and/or shapes in the 4 color pattern of the rug 1521).

FIG. 16 shows an exemplary hang tag 1620 (POP tag) explaining the 1, 2, 3 process of selecting and purchasing a rug in accordance with one example of the present invention. The steps include: 1) Pick Your Color; 2) Pick Your Size (and shape); and 3) Purchase the Rug (either purchase from inventory, stock, or special order for shipment within 7 days). The rugs shown in the hang tag are preferably shown to scale to allow the consumer to compare the different shapes, sizes and different appearances and designs therein. For example, the runner has a much different interior design than the rectangle, round, square, or oval. Also, it is preferred that the hang tag show the different colors of a particular pattern (rug) in a full view as well as the color runner.

The hang tag 1620 may be used with any feature rug, feature rug and color runner, feature rug and color rug, feature rug and runner, color runner, color rug, and/or the like alone or together with an order form 1920 as a rug sales or marketing system to facilitate and enhance the purchase and sales of rugs.

FIGS. 17 and 18 show respective hang tags 1720, 1820 which provide additional product, price and/or ordering information to the consumer. Again, it is preferred that the images of rugs or products on the hang tags be to scale and show the sometimes dramatic differences between the products (small versus large rectangle, runner versus rectangle, round versus square, etc.). The empty boxes below the different rugs may contain the price, SKU number, bar code, color code, and/or the like.

Note that the runner of hang tag 1820 is much different than the rectangular rugs (no interior design area). If a customer did not have access to the picture or image of the runner shown in hang tag 1820 and ordered the runner based on looking at a rectangular rug or even a round, square or oval rug, the consumer may be very disappointed in the runner and want to return it. Consequently, the hang tags 1126, 1228, 1230, 1328, 1330, 1428, 1530, 1620, 1720, 1820, and 2026 when used properly can reduce or prevent returns. This will reduce costs and provide the purchaser with a more enjoyable shopping experience.

FIG. 19 shows an exemplary order form 1920 which can be used by a customer, sales person, cashier, or the like in combination with the sample units, elements, systems, and/or hang tags to purchase and/or order one or more rugs. A similar form may be used to purchase other surface covering, wall covering or floor covering products.

Figure 20:
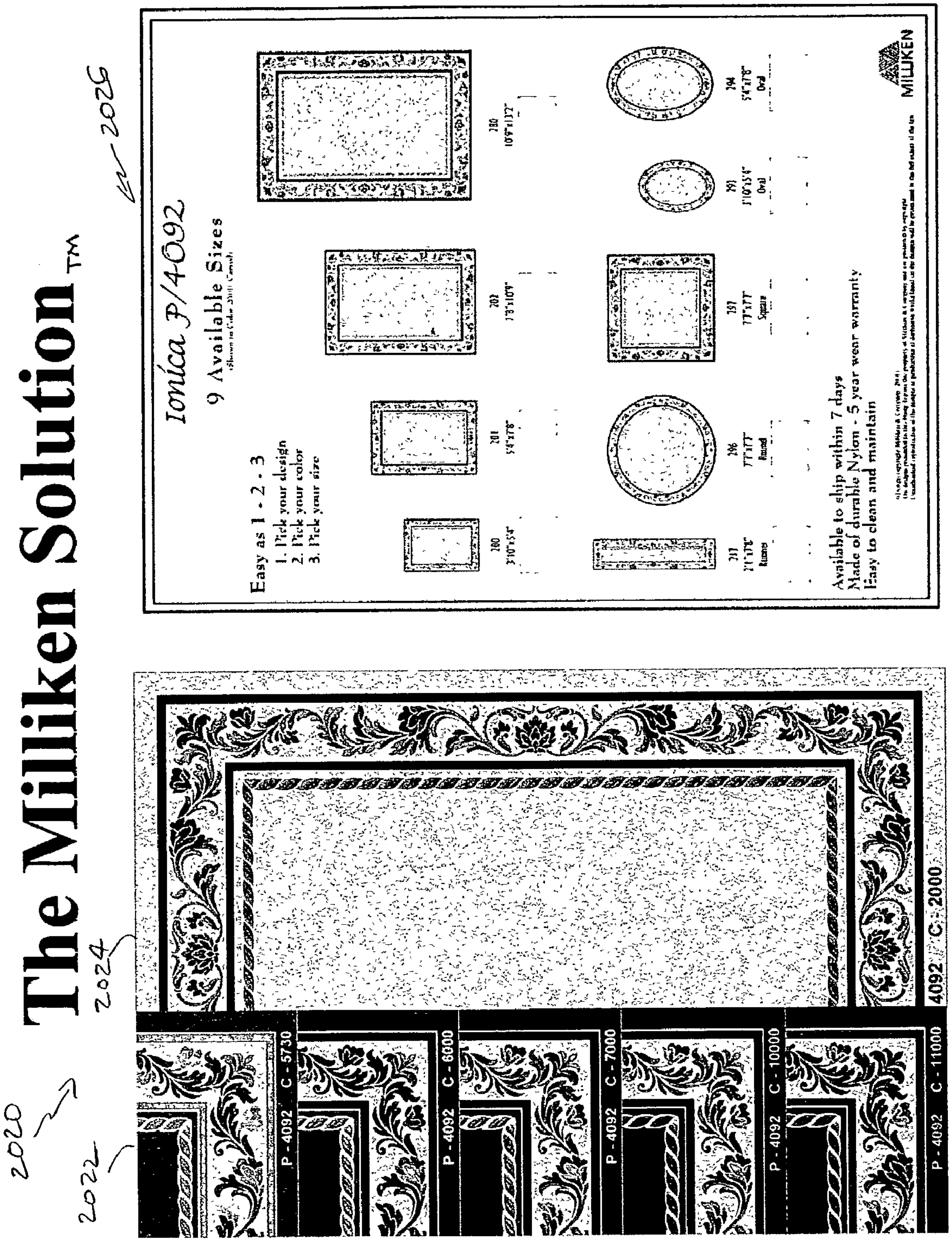
FIG. 20 is a plan view representation of an exemplary surface covering display system or unit.
Figure 20A:
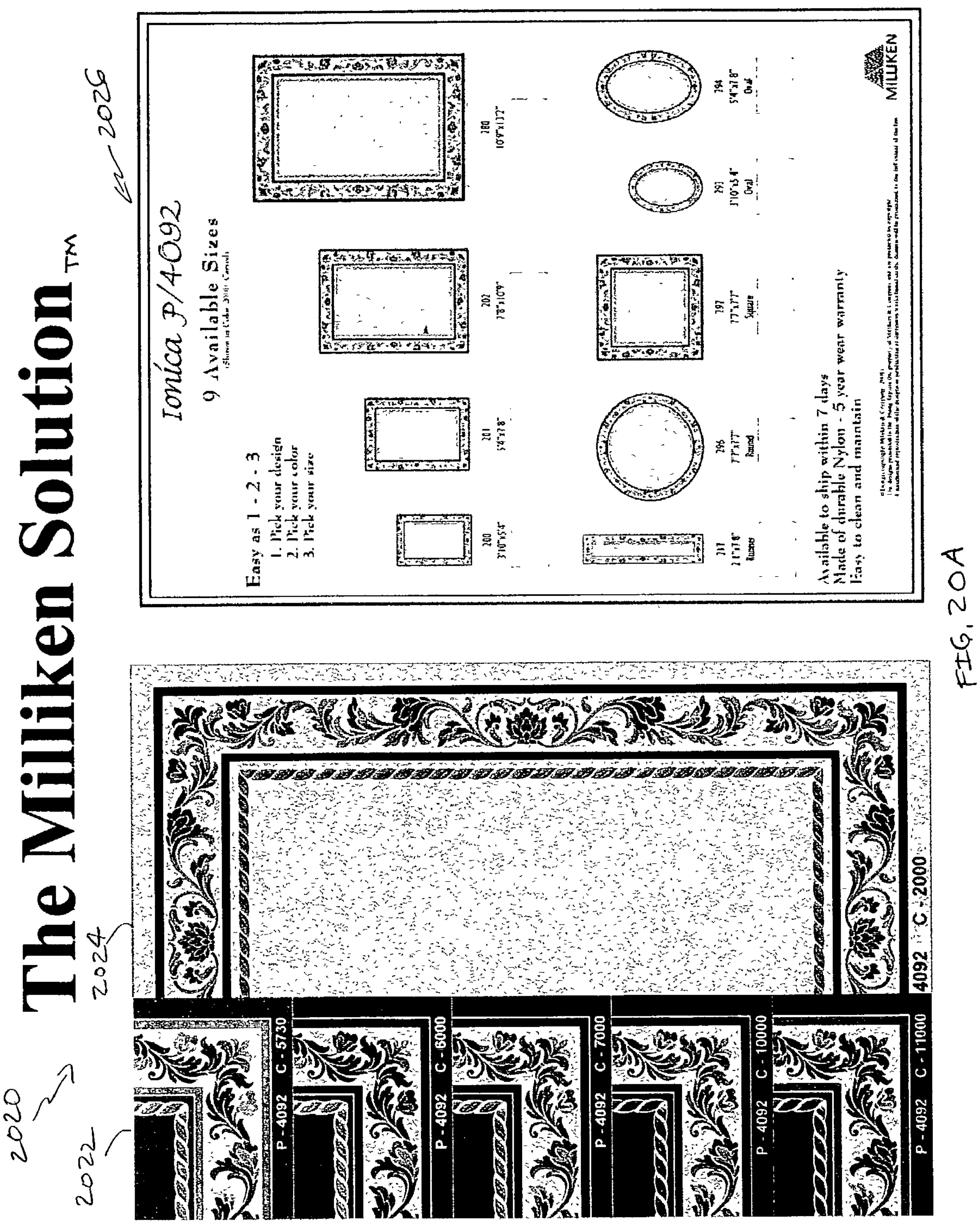
FIG. 20A is a black and white copy of FIG. 20.

FIG. 20 shows an exemplary marketing system name The Milliken Solution™ which provides a retailer, home store, carpet store, department store, or the like, a color runner 2022, a feature rug 2024 and a hang tag 2026 which provide the consumer or retailer 54 (one design or pattern, 6 colors, 9 shapes or sizes) different product options, to scale images on the hang tag, a simple selection and purchase system, and/or the like. The hang tag is shown enlarged so that the text and images are legible. It is to be understood that the hang tag may be about 8-½ inches×11 inches on paper stock while the color runner may be about 2 ft.×9 ft. printed or dyed carpet, and the feature rug may be about 6 ft.×9 ft. printed or dyed carpet.

Figure 21:
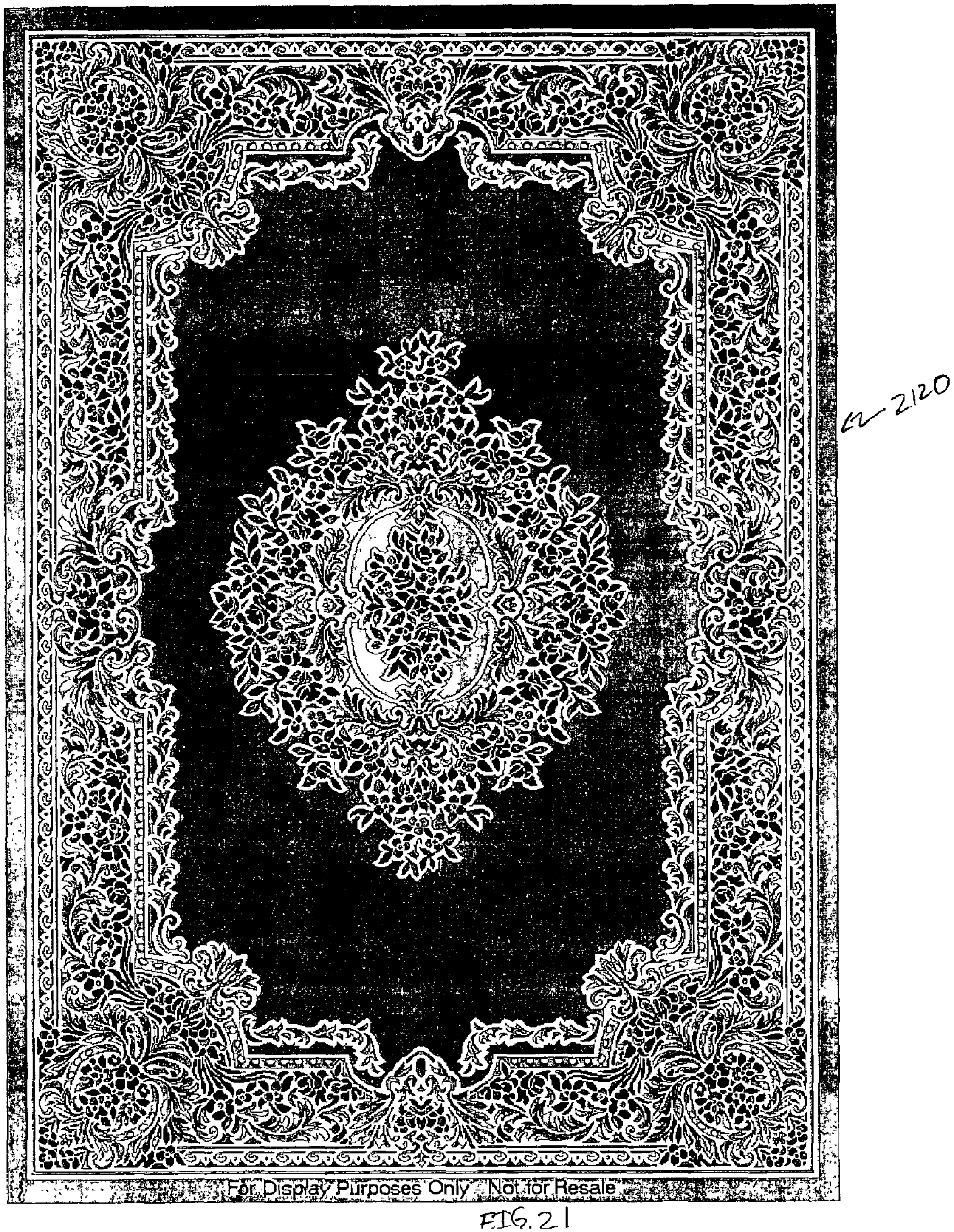
FIG. 21 is a plan view illustration of an exemplary feature rug.
Figure 21A:
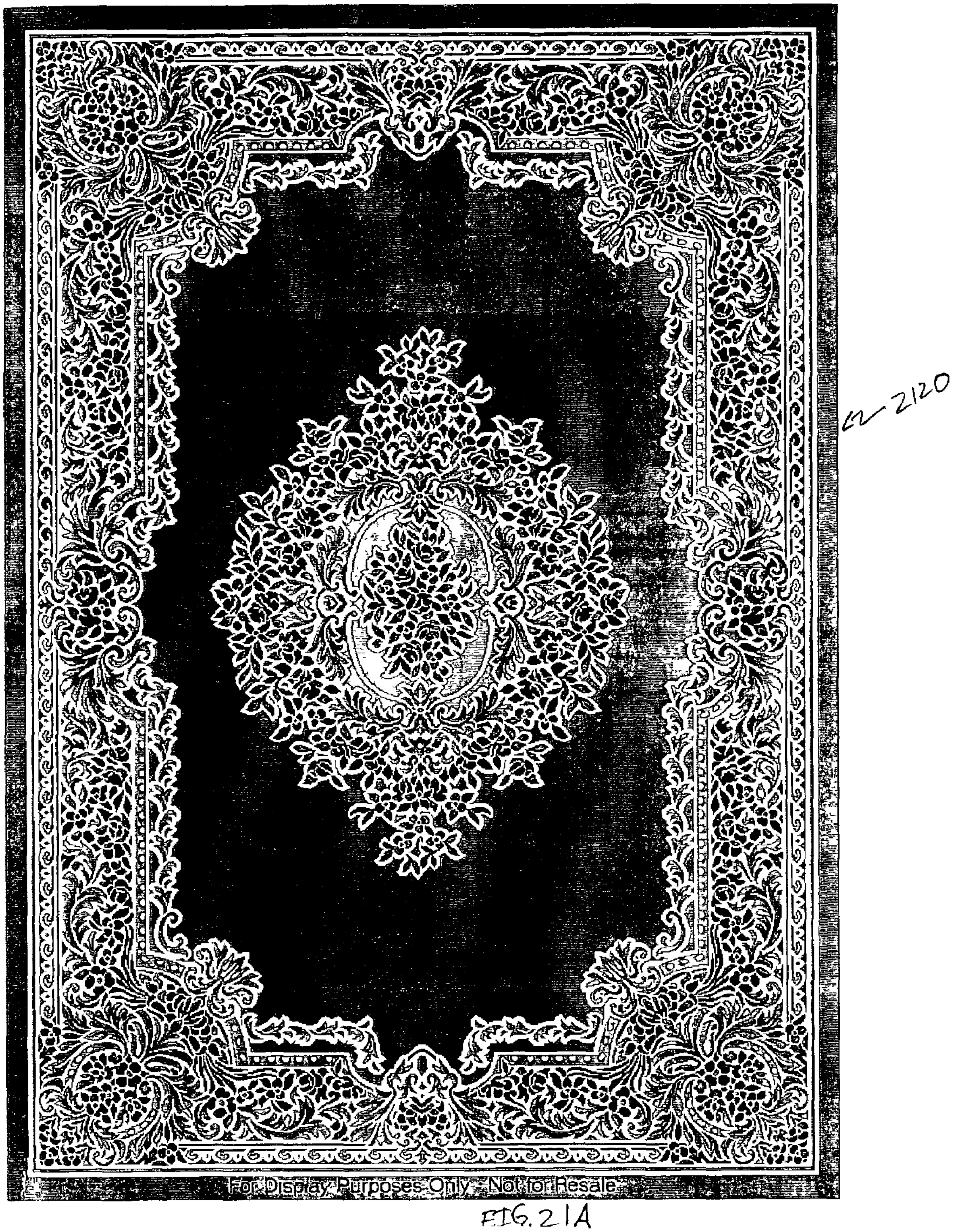
FIG. 21A is a black and white copy of FIG. 21.

FIG. 21 shows an exemplary feature rug 2120 that may be used in any of the systems or units of the present invention where the feature rug portion is a separate rug. The feature rug 2120 has text at the bottom "For Display Purposes Only—Not For Resale" to prevent the display rug from being sold.

Figure 22:
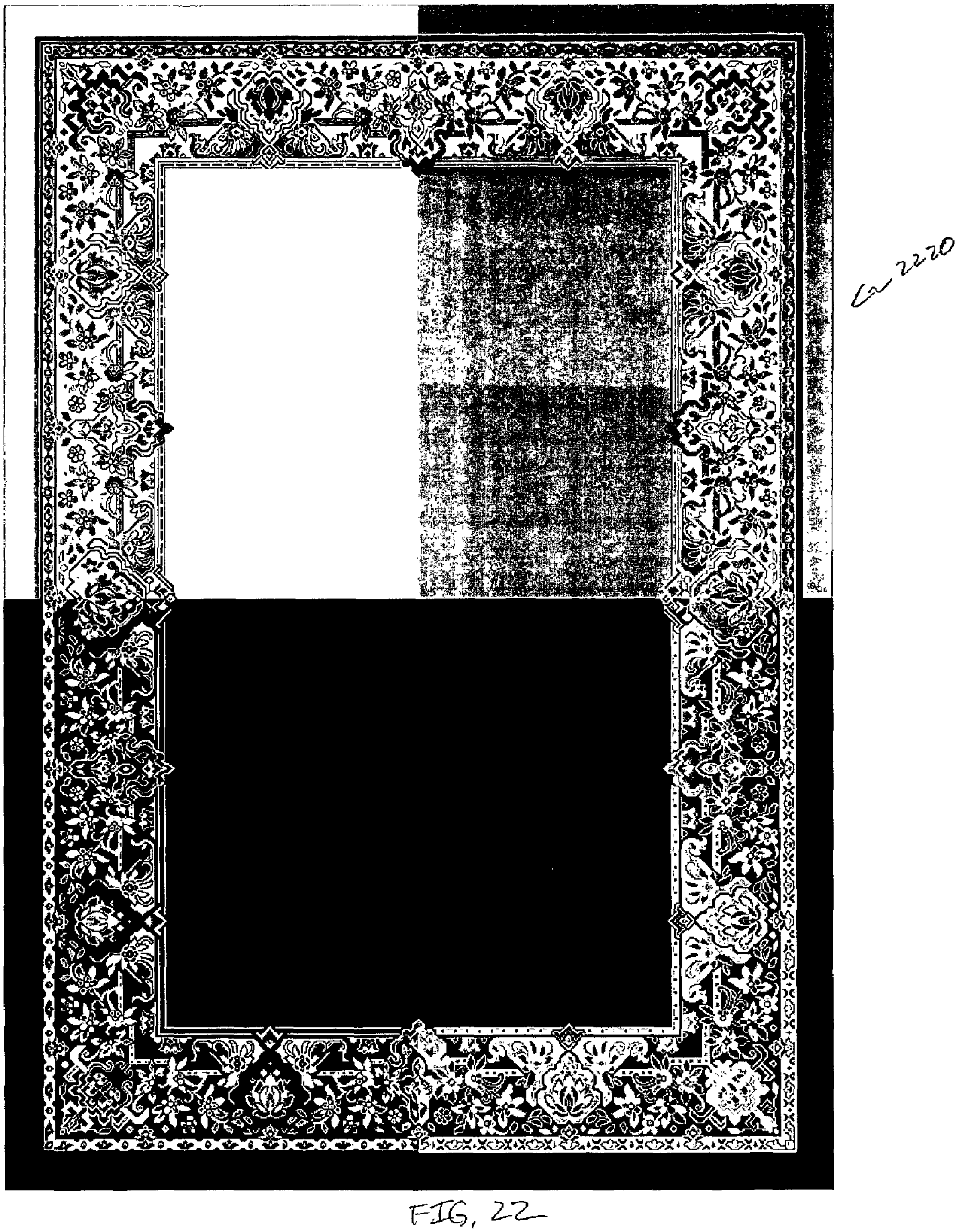
FIG. 22 is a plan view illustration of an exemplary color rug.
Figure 22A:
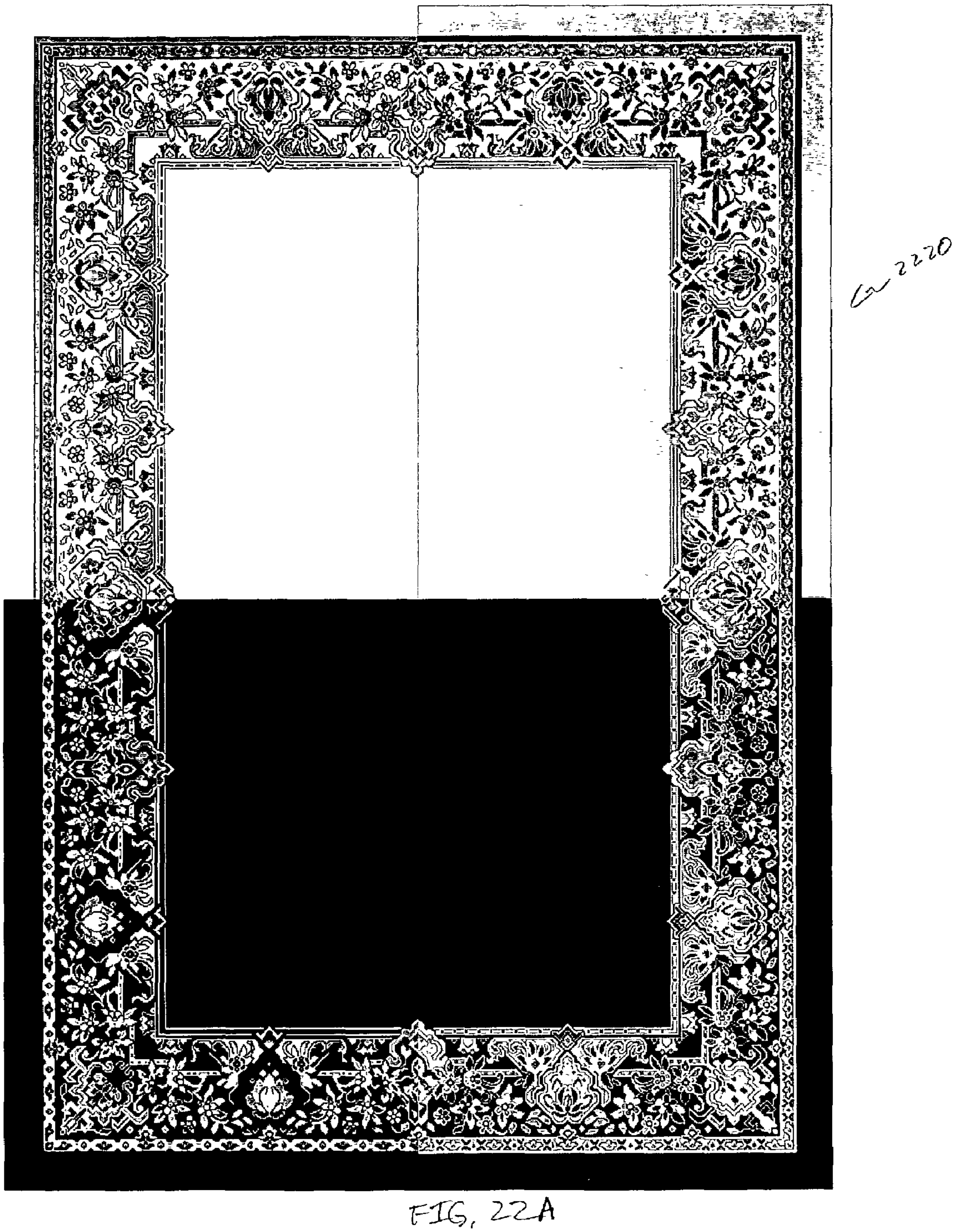
FIG. 22A is a black and white copy of FIG. 22.

FIG. 22 shows an exemplary color rug 2220 which may be used as a full size feature rug or as a smaller color rug to be used in combination with a full sized feature rug (like color rug 1424 of FIG. 14).

Although it is preferred that the feature rug portion or element and alternative pattern portion or element of the surface covering display unit or sample rug or area rug sample (such as 320, 420, 540, 920, 1020, 1120, 1420) of the present invention both form part of a single item or rug, it is contemplated that the feature rug element and the alternative pattern element may be separate rugs or separate carpet pieces which may be joined together or hung together on the same rack or arm of the display. It is preferred that they be a single item as this provides for reduced cost of materials, reduced weight, reduced shipping cost, ease of attachment to a rack, ease of ordering a single sample unit, can be printed or dyed as a single item, and/or the like.

For example, certain retailers, dealers, home centers, or the like may want the feature rug element and alternative pattern element (color runner, color rug) to be separate rugs so that the display rugs themselves may be purchased or sold.

In accordance with one particular embodiment of the present invention, the display unit or system provides the customer or consumer with the look and feel of a feature rug, true color of a plurality of color options, a rug tag which shows to scale images of the alternative sizes and shapes, and provides for special order and direct shipment of selected products to the customer or store. Also, the rug tag may provide full color views of all of the color options.

In accordance with at least one embodiment, the present invention provides a merchandising concept which increases the number of options, decreases costs, and increases the sales of product per square foot of display space.

In accordance with at least one selected embodiment of the present invention, there is provided a business plan or method incorporating the display units or systems of the present invention, which drives or at least facilitates special order of products, and/or which gives the customer, store, dealer, or the like a combination of options, SKUs, products, units, systems, elements, and/or the like.

In accordance with at least one embodiment of the present invention, the rug tag, hang tag, POP tag, product information, or the like includes one or more of color choices, to scale images, images of alternative products, design or patterns to scale, easy order process steps or information, order form, product codes, bar codes, color codes, SKU numbers, prices, availability, shipping options, ordering options, payment options, contact information, web site information, help number, and the like.

In accordance with one aspect of the present invention, the product offering can be easily updated or changed by replacing the hang tag, color runner, color rug, feature rug, sample rug, sample unit, and/or the like. For example, if a particular color of the colors on the color runner is not selling, then a new color runner can be printed and installed in place of the old color runner. In this way, the product offering can be kept fresh, new, and/or include only best sellers. Likewise, the present invention provides for low cost marketing studies of new products by allowing numerous existing and/or new products to be offered on one side of a rack of a display. For example, 3 of the colors offered may be best sellers while the other 3 may be new test colors. Similarly, the hang tag may be modified as needed to add and/or drop sizes, shapes, colors, finishes, bases, edge treatments, prices, bar codes, and/or the like.

In accordance with one aspect of the present invention, consumers or customers may be provided with a multitude of choices or options from a product offering of only the best sellers of a particular product. For example, 10 best sellers (patterns, designs) may be offered in 6 different colors and in 9 different shapes and/or sizes. This provides the consumer with 540 options or choices while requiring the retailer or dealer to only display 10 sample units or rugs.

It has been discovered that rug customers want choices in color possibly more than choices in design or pattern when it comes to purchasing an area rug. Hence, the present invention provides color runners, alternative color elements, color rugs, and/or hang tags which give the customer what they want—choices of color so they can match other furnishings, flooring, walls, etc.

Also, in accordance with the present invention, it has been discovered that sales of product can be increased by increasing the choices or options of color, shape, and/or size while providing the customer the look and feel of the product, true colors of the product, and a convenient means to compare the choices or options.

Special order or custom order and direct shipment of products to the consumer or purchaser provide economies and efficiencies to the seller, retailer, dealer, and/or supplier. For example, no inventory cost, no obsolescence, no inventory labor, no inventory tracking, no stock space, no warehouse space, etc. This reduces the costs of the supplier or retailer and may lead to reduced prices for products. Hence, the present invention may provide for reduced inventory or no inventory and the benefits inherent therein.

In accordance with one embodiment of the present invention, a shopper, customer or consumer selects and purchases a rug by looking at selected feature rugs, color runners, and hang tags, selecting a particular rug (size, color, shape, pattern), takes the rug from stock, purchases the rug, and takes it home.

In another embodiment, the customer looks at selected sample display units, selects two different rugs, fills out an order form, takes it to the cashier, pays for the order, and the rugs are shipped directly to the customer's home (for extra large rugs, the customer may have to pick them up at the store).

In yet another embodiment, the customer looks at selected sample display units, selects a particular rug, has a sales associate help them fill out an order form, they pay for the order, and then the rug is manufactured and direct shipped to the customer.

In still yet another embodiment, the customer selects one rug out of inventory and special orders a second different rug. For example, the feature rug may be in inventory while one of the alternative shapes, sizes, or colors thereof must be special ordered.

In accordance with one example, the feature rug is about 5 ft.×8 ft., the color runner is about 2 ft.×8 ft., and the POP tag is about 7 inches×16-½ inches.

It is, of course, to be understood that the present invention extends to any surface covering display element, such as wall covering or floor covering display elements which incorporate an arrangement of colored and/or patterned regions which display patterns and/or coloration schemes selectable by a potential purchaser. Such a floor covering element is useful in the simultaneous display of multiple pattern, border or color options for area rugs, as well as for other floor covering elements including floor mats, broadloom carpeting and carpet tile. Thus, the embodiments and practices which have been particularly illustrated and described herein are intended to be exemplary only and are in no event to be construed as in any manner limiting the scope of the invention. Accordingly, it is to be understood and appreciated that the present invention is intended to extended to all modifications and variations as may incorporate the broad aspects of the invention within the full spirit and scope of the appended claims and all equivalents thereto.

What is claimed is:

1. A surface covering sample display unit for use in selection of a surface covering product, the sample display unit comprising: a patterned display rug having a main pattern covering a majority of the display rug, a patterned color runner including a patterned surface wherein said patterned surface includes an arrangement of at least two alternative patterns wherein the alternative patterns contain the same design as the main pattern and incorporate at least one color difference and wherein the alternative patterns on the runner contain at least a portion of the main pattern of the display rug and wherein said portion is identical in design to the corresponding portion of the display rug and at least one of the runner alternative patterns incorporates a color difference compared to the main pattern of the display rug, and a product information element providing information relating to at least one of product shape, size, color, pattern, price, finish, edge treatment, base, and combinations thereof, and wherein said product information element comprises one of a hang tag, POP tag, rug tag, brochure, sheet, page, order form, and combinations thereof.

2. The sample display unit as recited in claim 1, wherein said color runner is jet dyed.

3. The sample display unit as recited in claim 1, wherein said patterned surface of said runner includes an arrangement of at least three or more alternative patterns.

4. The sample display unit as recited in claim 1, wherein said patterned surface of said runner includes an arrangement of at least four or more alternative patterns.

5. The sample display unit as recited in claim 1, wherein at least one of said display rug and color runner further includes one or more integral readable pattern identification legends.

6. The sample display unit as recited in claim 1, wherein said product information element comprises a POP tag.

* * * * *